United States Patent
Shimazaki et al.

(10) Patent No.: US 12,488,923 B2
(45) Date of Patent: Dec. 2, 2025

(54) SOLENOID, DAMPING FORCE ADJUSTMENT MECHANISM, AND DAMPING FORCE ADJUSTABLE SHOCK ABSORBER

(71) Applicant: Hitachi Astemo, Ltd., Hitachinaka (JP)

(72) Inventors: Miho Shimazaki, Hitachinaka (JP); Milton Muzvidziwa, Hitachinaka (JP); Koichi Yamaka, Hitachinaka (JP)

(73) Assignee: HITACHI ASTEMO, LTD., Ibaraki (JP)

( * ) Notice: Subject to any disclaimer, the term of this patent is extended or adjusted under 35 U.S.C. 154(b) by 285 days.

(21) Appl. No.: 18/274,887

(22) PCT Filed: Feb. 9, 2022

(86) PCT No.: PCT/JP2022/005009
§ 371 (c)(1),
(2) Date: Jul. 28, 2023

(87) PCT Pub. No.: WO2022/181319
PCT Pub. Date: Sep. 1, 2022

(65) Prior Publication Data
US 2024/0083208 A1    Mar. 14, 2024

(30) Foreign Application Priority Data
Feb. 23, 2021   (JP) .................... 2021-026852

(51) Int. Cl.
*H01F 7/16*        (2006.01)
*B60G 17/015*    (2006.01)

(52) U.S. Cl.
CPC ............. *H01F 7/16* (2013.01); *B60G 17/015* (2013.01); *B60G 2500/11* (2013.01)

(58) Field of Classification Search
CPC .............. B60G 17/015; B60G 2500/11; B60G 2500/10; B60G 17/06; H01F 7/16;
(Continued)

(56) References Cited

U.S. PATENT DOCUMENTS

2009/0039992 A1* 2/2009 Ryuen ................... H01F 7/1607
                                                                 335/255

FOREIGN PATENT DOCUMENTS

JP      01-033909       2/1989
JP      H10-54476 A    2/1998
(Continued)

OTHER PUBLICATIONS

International Search Report issued May 10, 2022 in International Application No. PCT/JP2022/005009, with English-language translation.

(Continued)

*Primary Examiner* — Mohamad A Musleh
(74) *Attorney, Agent, or Firm* — Wenderoth, Lind & Ponack, L.L.P.

(57) ABSTRACT

Provided is a solenoid comprising a molded coil, an anchor, and an armature. In the anchor, an outer peripheral convex portion and an inner peripheral convex portion are formed. When no current is being applied, axial distance between the outer peripheral convex portion of the anchor and an outer peripheral portion of the armature which is radially closest to the outer peripheral convex portion is smaller than axial distance between the inner peripheral convex portion of the anchor and an inner peripheral portion of the armature which is radially closest to the inner peripheral convex portion. In other words, timing at which the outer peripheral convex portion of the anchor and the outer peripheral portion of the armature face each other in a radial direction is shifted from timing at which the inner peripheral convex portion of the (Continued)

anchor and the inner peripheral portion of the armature face each other in the radial direction.

11 Claims, 8 Drawing Sheets

(58) Field of Classification Search
CPC .......... H01F 7/1607; H01F 7/13; F16F 9/461; F16F 9/465; F16F 9/346; F16F 9/46; B60Y 2400/86
See application file for complete search history.

(56) References Cited

FOREIGN PATENT DOCUMENTS

| | | | | |
|---|---|---|---|---|
| JP | 2011-233790 A | 11/2011 | | |
| JP | 2013-77792 A | 4/2013 | | |
| JP | 2017-143156 | 8/2017 | | |
| JP | 2017143156 A * | 8/2017 | | |
| WO | WO-2012067178 A1 * | 5/2012 | ........... | H01F 7/1607 |
| WO | 2017073219 A1 | 5/2017 | | |

OTHER PUBLICATIONS

Written Opinion of the International Searching Authority issued May 10, 2022 in International Application No. PCT/JP2022/005009, with English-language translation.

* cited by examiner

Fig. 7

| | CONVEX PORTION (Wi) | CONCAVE PORTION (Wo) | A | B |
|---|---|---|---|---|
| a | 3 | 1 | × | × |
| b | 2 | 1 | × | × |
| c | 1 | 1 | ○ | ○ |
| d | 1 | 2 | ○ | ○ |
| e | 1 | 3 | ○ | ○ |
| f | 1 | 5 | ○ | ○ |
| g | 1 | 6 | ○ | ○ |
| h | 1 | 7 | ○ | ○ |
| i | 1 | 9 | ○ | ○ |
| j | 1 | 15 | ○ | ○ |
| k | 1 | 95 | ○ | ○ |

A: CONCAVE PORTION≥CONVEX PORTION
B: ANALYSIS RESULT
○: GOOD
×: BAD

SOLENOID, DAMPING FORCE ADJUSTMENT MECHANISM, AND DAMPING FORCE ADJUSTABLE SHOCK ABSORBER

TECHNICAL FIELD

The disclosure relates, for example, to solenoids, damping force adjustment mechanisms, and damping force adjustable shock absorbers.

BACKGROUND ART

A vehicle such as a four-wheel automobile is provided with shock absorbers (dampers) between a vehicle body (sprung) side and each wheel (unsprung) side. Known as such a vehicle shock absorber is, for example, a damping force adjustable hydraulic shock absorber that variably adjusts damping force according to driving conditions, vehicle behavior, and other like matters. The damping force adjustable hydraulic shock absorber configures, for example, a semi-active suspension of a vehicle.

The damping force adjustable hydraulic shock absorber adjusts the valve-opening pressure of a damping force adjustment valve by means of a variable damping force actuator and is thus capable of adjusting a generated damping force in a variable manner. Patent Literature 1, for example, refers to an electromagnetic device used as a variable damping force actuator. Patent Literature 2 refers to an electromagnet including a movable core provided with a concave portion, and a fixed core provided with a convex portion.

CITATION LIST

Patent Literature

PTL 1: Japanese Unexamined Patent Application Publication No. 2017-143156
PTL 2: Japanese Unexamined Patent Application Publication No. Hei 01-33909

SUMMARY OF INVENTION

Technical Problem

For example, according to the art disclosed in Patent Literature 1, the "axial distance between the inner convex portion of the stator and the mover" and the "axial distance between the outer convex portion of the stator and the mover" are set to be the same value. Accordingly, the peaks of the forces generated in top portions of the stator and the mover with respect to the stroke of the mover become the same. This makes it difficult to secure the stability and controllability of thrust force of the mover.

An object of one embodiment of the invention is to provide a solenoid, a damping force adjustment mechanism, and a damping force adjustable shock absorber which make it possible to secure the stability and controllability of thrust force of a mover.

Solution to Problem

One embodiment of the invention provides a solenoid comprising a coil wound into an annular shape and configured to generate magnetic force by being energized, a mover comprising a magnetic element provided to be movable in a winding axis direction of the coil, and a stator arranged to face the mover. An outer peripheral convex portion and an inner peripheral convex portion are formed in the stator. When no current is being applied, axial distance between the outer peripheral convex portion of the stator and an outer peripheral portion of the mover which is radially closest to the outer peripheral convex portion is smaller than axial distance between the inner peripheral convex portion of the stator and an inner peripheral portion of the mover which is radially closest to the inner peripheral convex portion.

One embodiment of the invention provides a damping force adjustment mechanism comprising a coil wound into an annular shape and configured to generate magnetic force by being energized, a mover comprising a magnetic element provided to be movable in a winding axis direction of the coil, a stator arranged to face the mover, and a control valve controlled by motion of the mover. An outer peripheral convex portion and an inner peripheral convex portion are formed in the stator. When no current is being applied, axial distance between the outer peripheral convex portion of the stator and an outer peripheral portion of the mover which is radially closest to the outer peripheral convex portion is smaller than axial distance between the inner peripheral convex portion of the stator and an inner peripheral portion of the mover which is radially closest to the inner peripheral convex portion.

One embodiment of the invention provides a damping force adjustable shock absorber comprising a cylinder in which hydraulic fluid is sealingly contained, a piston that is slidably provided inside the cylinder, a piston rod that is coupled to the piston and extends outside the cylinder, and a damping force adjustment mechanism configured to generate damping force by controlling a hydraulic fluid flow generated by sliding motion of the piston in the cylinder. The damping force adjustment mechanism comprises a coil wound into an annular shape and configured to generate magnetic force by being energized, a mover comprising a magnetic element provided to be movable in a winding axis direction of the coil, a stator arranged to face the mover, and a control valve controlled by motion of the mover. An outer peripheral convex portion and an inner peripheral convex portion are formed in the stator. When no current is being applied, axial distance between the outer peripheral convex portion of the stator and an outer peripheral portion of the mover which is radially closest to the outer peripheral convex portion is smaller than axial distance between the inner peripheral convex portion of the stator and an inner peripheral portion of the mover which is radially closest to the inner peripheral convex portion.

The embodiments of the invention make it possible to secure the stability and controllability of thrust force of the mover.

BRIEF DESCRIPTION OF DRAWINGS

FIG. 7 is an explanatory view showing, in the form of a table, dimension ratios and evaluations of the 11 examples which are differentiated from one another in ratio of the concave and convex portions.

DESCRIPTION OF EMBODIMENTS

The following discussion explains a solenoid, a damping force adjustment mechanism, and a damping force adjustable shock absorber according to embodiments with an example of a case in which the solenoid, the damping force adjustment mechanism, and the damping force adjustable shock absorber are used in a damping force adjustable hydraulic shock absorber, with reference to the attached drawings.

Figure 1:
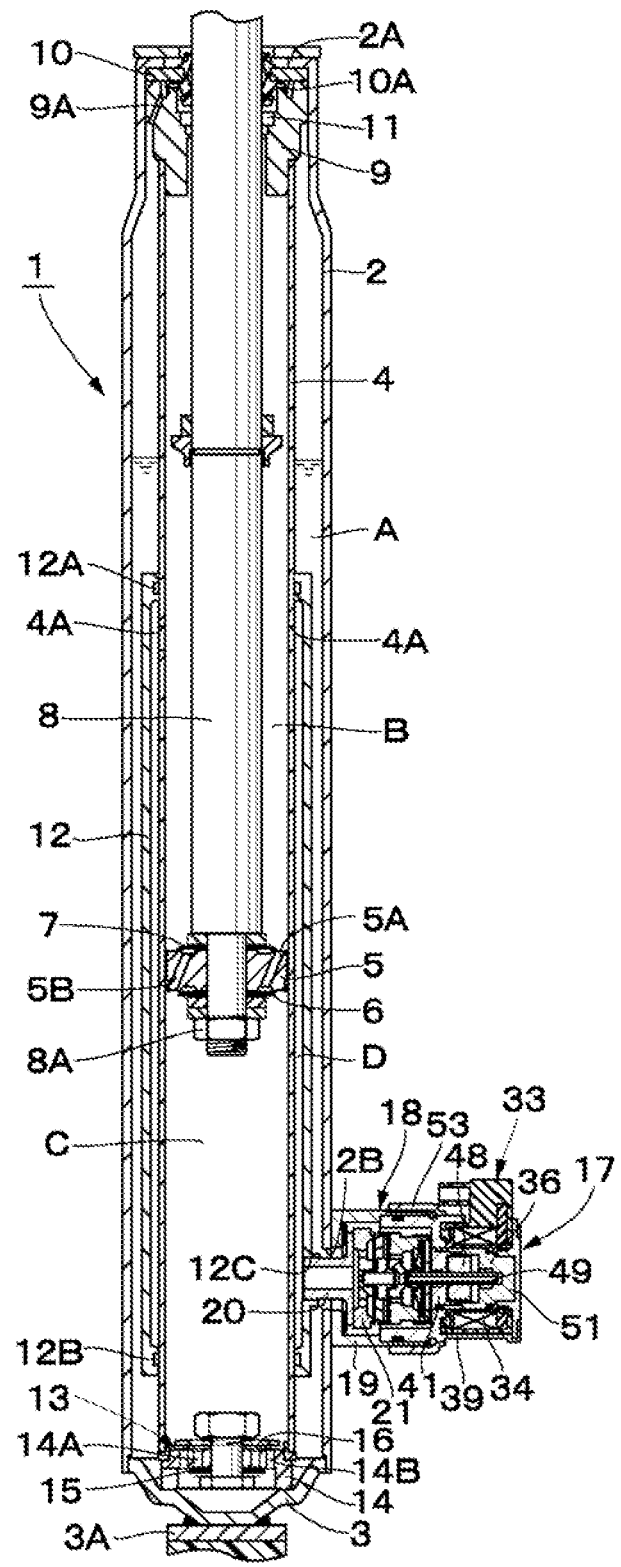
FIG. 1 is a longitudinal sectional view of a damping force adjustable shock absorber in which a solenoid and a damping force adjustment mechanism according to respective embodiments are installed.

FIGS. 1 to 4 show the embodiments. In FIG. 1, a damping force adjustable hydraulic shock absorber 1 (hereinafter, referred to as shock absorber 1) comprises a damping force adjustment mechanism 17 using a solenoid 33 as a drive source. More specifically, the shock absorber 1 as a damping force adjustable shock absorber is configured by including an outer tube 2 and an inner tube 4 as cylinders, a piston 5, a piston rod 8, a rod guide 9, and the damping force adjustment mechanism 17.

The shock absorber 1 that is a hydraulic shock absorber comprises the outer tube 2 forming an outer shell and having the shape like a bottomed cylinder. The outer tube 2 is closed at a lower end side with a bottom cap 3 by welding means or another like means. An upper end side of the outer tube 2 is a swaged portion 2A that is bent radially inwards. Provided between the swaged portion 2A and the inner tube 4 are the rod guide 9 and a seat member 10. On a lower portion side of the outer tube 2, an opening 2B is formed to be concentric with a connecting port 12C of a middle tube 12. The damping force adjustment mechanism 17 is attached to the lower portion side of the outer tube 2 so as to face the opening 2B. The bottom cap 3 is provided, for example, with an attachment eye 3A attached to a wheel side of a vehicle.

The inner tube 4 is provided inside the outer tube 2 coaxially with the outer tube 2. A lower end side of the inner tube 4 is attached to a bottom valve 13 in a fitted manner. An upper end side of the inner tube 4 is attached to the rod guide 9 in the fitted manner. Oil liquid as hydraulic liquid (hydraulic fluid) is sealingly contained in the outer tube 2 and the inner tube 4 as cylinders. The hydraulic liquid is not limited to oil liquid or oil but may be, for example, water in which additive is mixed or another like liquid.

An annular reservoir chamber A is formed between the inner tube 4 and the outer tube 2. Gas is sealingly contained in the reservoir chamber A with the oil liquid. The gas may be atmospheric-pressure air or a gaseous body such as a compressed nitrogen gas. The reservoir chamber A compensates the entry and exit of the piston rod 8. A fluid hole 4A is radially drilled in the inner tube 4 at an intermediate position in a length direction (axial direction) of the inner tube 4. The fluid hole 4A brings a rod-side fluid chamber B into constant communication with an annular fluid chamber D.

The piston 5 is slidably provided inside the inner tube 4. The piston 5 defines (demarcates) an interior portion of the inner tube 4 into two chambers including the rod-side fluid chamber 8 and a bottom-side fluid chamber C. A plurality of fluid passages 5A and a plurality of fluid passages 5B are formed in the piston 5 at intervals in a circumferential direction. The fluid passages 5A. 5B allow the rod-side fluid chamber B and the bottom-side fluid chamber C to communicate with each other.

An extension-side disc valve 6 is provided at a lower end surface of the piston 5. When pressure in the rod-side fluid chamber B exceeds a relief set pressure while the piston 5 is making an upward sliding displacement during an extension stroke of the piston rod 8, the extension-side disc valve 6 is opened to relieve or release the pressure to the bottom-side fluid chamber C side through each of the fluid passages 5A. The relief set pressure is set higher than valve-opening pressure in a situation where the damping force adjustment mechanism 17 is set to be hard.

A compression-side check valve 7 is provided in an upper end surface of the piston 5. The check valve 7 is opened when the piston 5 makes a downward sliding displacement during a compression stroke of the piston rod 8, and closed otherwise. The check valve 7 allows the oil liquid in the bottom-side fluid chamber C to flow through each of the fluid passages 5B toward the rod-side fluid chamber B and prevents the oil liquid from flowing in a reverse direction. Valve-opening pressure of the check valve 7 is set lower than valve-opening pressure in a situation where the damping force adjustment mechanism 17 is set to be soft, whereby damping force is substantially not generated. When it is said here that the valve-opening pressure substantially does not generate damping force, it means that the valve-opening pressure of the check valve 7 is equal to or smaller than friction of the piston 5 or the seal member 10 and therefore does not affect vehicle motion.

The piston rod 8 extends in an axial direction (vertical direction in FIG. 1) within the inner tube 4. A lower end side of the piston rod 8 is inserted in the inner tube 4. The piston rod 8 is secured to the piston 5 with a nut 8A or the like. An upper end side of the piston rod 8 protrudes outside the outer tube 2 and the inner tube 4 through the rod guide 9. In other words, the piston rod 8 is coupled to the piston 5 to extend outside the inner tube 4 and the outer tube 2. The piston rod 8 may be configured as a so-called double rod by further elongating the lower end of the piston rod 8 until the lower end outwardly protrudes from a bottom portion (bottom cap 3, for example) side.

The rod guide 9 having a stepped cylinder-like shape is provided in the upper end side of the inner tube 4. The rod guide 9 positions an upper side portion of the inner tube 4 at the center of the outer tube 2 and guides the piston rod 8 at an inner peripheral side thereof in an axially slidable manner. The seal member 10 having an annular shape is provided between the rod guide 9 and the swaged portion 2A of the outer tube 2. The seal member 10 is configured, for example, by baking elastic material, such as rubber, onto an annular disc made of metal which is provided with a hole at the center, through which the piston rod 8 extends. An inner periphery of the elastic material of the seal member 10 comes into sliding contact with an outer peripheral side of the piston rod 8, whereby the seal member 10 seals space between itself and the piston rod 8.

On a lower surface side of the seal member 10, a lip seal 10A function as a check valve is formed so as to extend to contact the rod guide 9. The lip seal 10A is arranged between a fluid holding chamber 11 and the reservoir chamber A. The lip seal 10A allows oil liquid or another like fluid in the fluid holding chamber 11 to flow through a return passage 9A of the rod guide 9 toward the reservoir chamber A side and prevents a reverse flow.

The middle tube 12 comprising a tube element is arranged between the outer tube 2 and the inner tube 4. The middle tube 12 is attached, for example, to an outer peripheral side of the inner tube 4 through upper and lower tubular seals 12A, 12B. The middle tube 12 forms the annular fluid chamber D inside. The annular fluid chamber D extends around the outer peripheral side of the inner tube 4 over the whole circumference of the inner tube 4. The annular fluid chamber D is a fluid chamber that is independent of the reservoir chamber A. The annular fluid chamber D is in constant communication with the rod-side fluid chamber B through the radial fluid hole 4A formed in the inner tube 4. The annular fluid chamber D functions as a passage in which a hydraulic liquid flow is generated by displacement of the piston rod 8. The connecting port 12C is provided at a lower end side of the middle tube 12. Attached to the connecting port 12C is a connecting pipe element 20 of the damping force adjustment valve 18.

The bottom valve 13 is provided between the bottom cap 3 and the inner tube 4 at the lower end side of the inner tube 4. The bottom valve 13 is configured by a valve body 14 that defines (demarcates) the reservoir chamber A and the bottom-side fluid chamber C between the bottom cap 3 and the inner tube 4, a compression-side disc valve 15 provided on a lower surface side of the valve body 14, and an extension-side check valve 16 provided on an upper surface side of the valve body 14. Fluid passages 14A, 14B are formed in the valve body 14 at intervals in a circumferential direction. The fluid passages 14A, 14B allow the reservoir chamber A and the bottom-side fluid chamber C to communicate with each other.

When pressure in the bottom-side fluid chamber C exceeds a relief set pressure while the piston 5 is making a downward sliding displacement during the compression stroke of the piston rod 8, the compression-side disc valve 15 is opened to relieve or release the pressure to the reservoir chamber A side through each of the fluid passages 14A. The relief set pressure is set higher than valve-opening pressure in a situation where the damping force adjustment mechanism 17 is set to be hard.

The extension-side check valve 16 is opened when the piston 5 makes the upward sliding displacement during the extension stroke of the piston rod 8, and closed otherwise. The check valve 16 allows the oil liquid in the reservoir chamber A to flow through each of the fluid passages 14B toward the bottom-side fluid chamber C and prevents the oil liquid from flowing in the reverse direction. Valve-opening pressure of the check valve 16 is set lower than valve-opening pressure in a situation where the damping force adjustment mechanism 17 is set to be soft, whereby damping force is substantially not generated.

The damping force adjustment mechanism 17 for variably adjusting a generated damping force of the shock absorber 1 is now discussed with reference to FIG. 2 as well as FIG. 1.

The damping force adjustment mechanism 17 is a mechanism configured to control the hydraulic liquid flow generated by sliding motion of the piston 5 in the cylinder (inner tube 4) to generate damping force and variably adjust the generated damping force of the shock absorber 1. The damping force adjustment mechanism 17 in FIG. 2 is in a state after a coil 34A of the solenoid 33 is externally energized (for example, controlled to generate a hard damping force), so that an armature 48 (actuating pin 49) moves to the left side in FIG. 2 (that is, in a valve-closing direction where a pilot valve element 32 is seated on a valve seat portion 26E of a pilot body 26).

As illustrated in FIG. 1, the damping force adjustment mechanism 17 is so provided that a proximal end side (left end side in FIG. 1) thereof is interposed between the reservoir chamber A and the annular fluid chamber D, and that a distal end side (right end side in FIG. 1) thereof protrudes from the lower portion side of the outer tube 2 in a radially outward direction. The damping force adjustment mechanism 17 controls the flow of the oil liquid from the annular fluid chamber D to the reservoir chamber A by means of the damping force adjustment valve 18, to thereby generate the damping force. The damping force adjustment mechanism 17 variably adjusts the generated damping force by adjusting valve-opening pressure of the damping force adjustment valve 18 with the solenoid 33 used as a variable damping force actuator. The damping force adjustment mechanism 17 thus controls the hydraulic fluid (oil liquid) flow generated by the sliding motion of the piston 5 in the inner tube 4, to thereby generate the damping force.

The damping force adjustment mechanism 17 is configured by including the damping force adjustment valve 18 that variably controls the flow of the oil liquid from the annular fluid chamber D to the reservoir chamber A to generate the damping force having hard or soft characteristics, and the solenoid 33 that adjusts the valve opening and closing operations of the damping force adjustment valve 18. In other words, the valve-opening pressure of the damping force adjustment valve 18 is adjusted by the solenoid 33 used as a variable damping force actuator. The generated damping force is thus controlled to be varied to have hard or soft characteristics. The damping force adjustment valve 18 is a valve, the valve opening and closing operations of which is adjusted by the solenoid 33. The damping force adjustment valve 18 is provided in a passage (for example, between the annular fluid chamber D and the reservoir chamber A) where the hydraulic liquid flow is generated by the displacement of the piston rod 8.

The damping force adjustment valve 18 is configured by including a substantially cylindrical valve case 19 that is so provided that a proximal end side thereof is secured around the opening 2B of the outer tube 2 and that a distal end side thereof protrudes from the outer tube 2 in the radially outward direction; the connecting pipe element 20 with a proximal end side fixed to the connecting port 12C of the middle tube 12 and a distal end side formed into an annular flange portion 20A, the connecting pipe element 20 being arranged in the inner side of the valve case 19 with space between the connecting pipe element 20 and the valve case 19, and a valve member 21 abutting against the flange portion 20A of the connecting pipe element 20.

Figure 2:
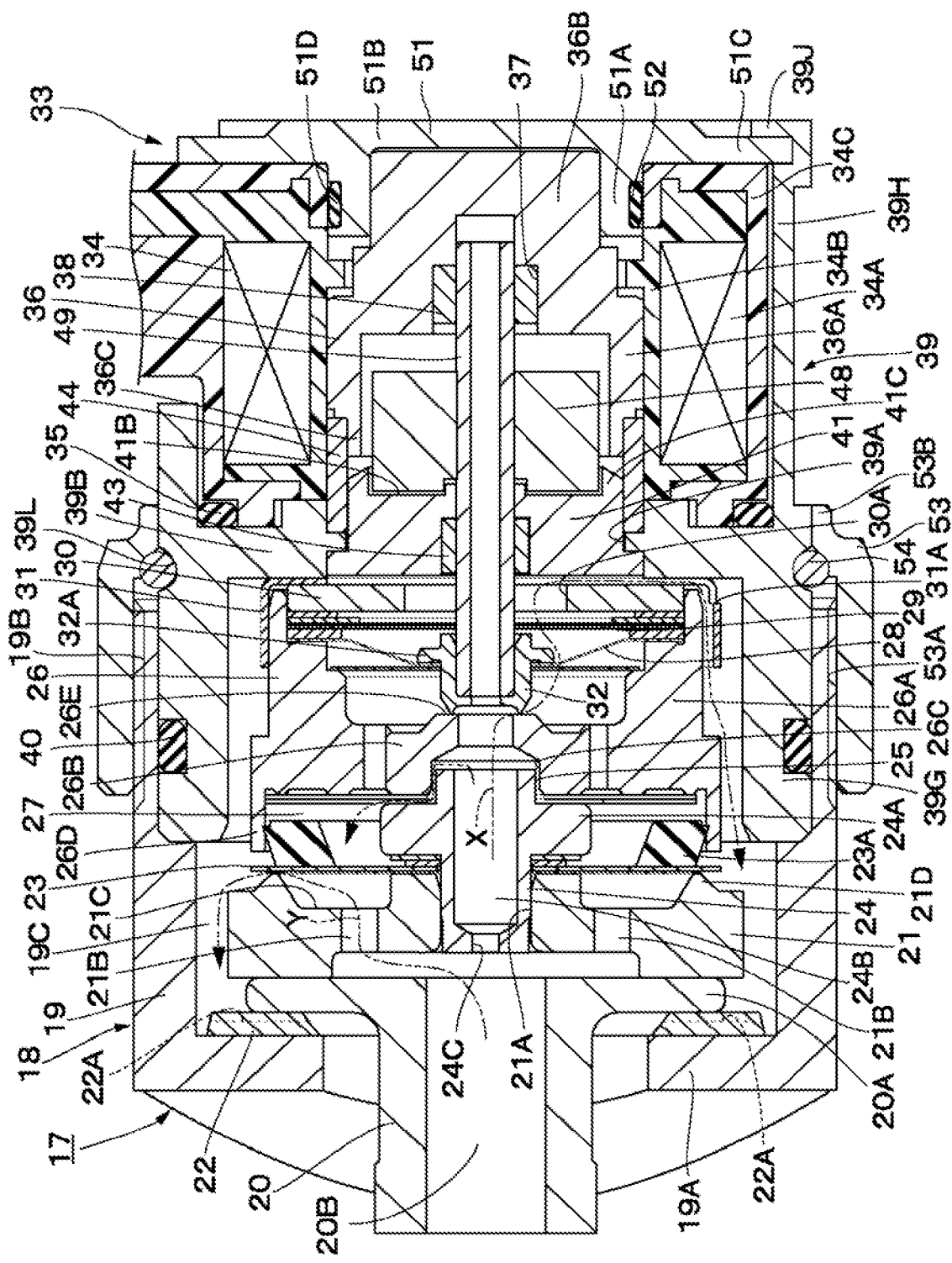
FIG. 2 is an enlarged sectional view focusing on a damping force adjustment valve and the solenoid which are shown in FIG. 1.

As illustrated in FIG. 2, the proximal end side of the valve case 19 is formed into an annular inner flange portion 19A extending radially inwards. The distal end side of the valve case 19 is formed into an external thread portion 19B, onto which a lock nut 53 is screwed. The lock nut 53 is used to couple the valve case 19 with a yoke 39 (one side tube portion 39G) of the solenoid 33. Space between an inner peripheral surface of the valve case 19 and an outer peripheral surface of the valve member 21 and space between the inner peripheral surface of the valve case 19 and an outer peripheral surface of the pilot body 26 and the like form an annular fluid chamber 19C that is in constant communication with the reservoir chamber A. The invention may be so configured that the valve case 19 and the solenoid 33 are coupled together using the lock nut 53 or, for example, that the distal end side of a valve case is swaged onto a yoke of a solenoid (instead of using a lock nut).

Inside the connecting pipe element 20 is a fluid passage 203, one side of which is in communication with the annular fluid chamber D, and the other side of which extends as far as the valve member 21. A circular ring-shaped spacer 22 is sandwiched between the flange portion 20A of the connecting pipe element 20 and the inner flange portion 19A of the valve case 19. The spacer 22 is provided with a plurality of notches 22A extending in a radial manner. The notches 22A function as radial fluid passages for bringing the fluid chamber 19C and the reservoir chamber A into communication with each other. Although the present embodiment provides the notches 22A for forming fluid passages in the spacer 22, notches (grooves) for forming fluid passages may be radially provided in the inner flange portion 19A of the valve case 19, instead of the spacer 22. Such a configuration makes it possible to omit the spacer 22 and therefore reduce the number of components.

The valve member 21 is provided with a center hole 21A located at the radial center and extending in an axial direction. The valve member 21 is further provided with a plurality of fluid passages 21B around the center hole 21A. The plurality of fluid passages 21B are spaced apart in a circumferential direction. Each of the fluid passages 21D is in constant communication with the fluid passage 20B side of the connecting pipe element 20 at one side (left side in FIGS. 1 and 2). An annular concave portion 21C and an annular valve seat 21D are provided in an end surface of the other side (right side in FIGS. 1 and 2) of the valve member 21. The annular concave portion 21C is formed around the other-side opening of the fluid passage 21B. The annular valve seat 21D is located radially outside the annular concave portion 21C. A main valve 23 is seated on and unseated from the annular valve seat 21D. Each of the fluid passages 21B of the valve member 21 functions as a passage, through which pressure fluid of a flow rate according to opening degree of the main valve 23 flows, between the fluid passage 20B of the connecting pipe element 20 which is in communication with the annular fluid chamber D and the fluid chamber 19C of the valve case 19 which is in communication with the reservoir chamber A.

The main valve 23 is configured by a disc valve, an inner region of which is held between the valve member 21 and a large diameter portion 24A of a pilot pin 24. The main valve 23 is seated on and unseated from the annular valve seat 21D of the valve member 21 at an outer peripheral side. An elastic seal member 23A is secured to an outer peripheral portion on a rear surface side of the main valve 23 by baking or another like means. The main valve 23 is opened by receiving pressure of the fluid passage 21B side (annular fluid chamber D side) of the valve member 21 to be unseated from the annular valve seat 21D. The fluid passage 21B (annular fluid chamber D side) of the valve member 21 thus comes into communication with the fluid chamber 19C (reservoir chamber A side) through the main valve 23. Amount (flow rate) of pressure fluid flowing in a direction of arrow Y at the time of the communication is variably adjusted according to opening degree of the main valve 23.

The pilot pin 24 is formed into a stepped cylinder-like shape and provided with the annular large diameter portion 24A in an axially middle portion thereof. The pilot pin 24 includes a center hole 24B at an inner peripheral side. The center hole 24B extends in the axial direction. A small diameter hole (orifice 24C) is formed in one end portion (end portion on the connecting pipe element 20 side) of the center hole 24B. One end side (left end side in FIGS. 1 and 2) of the pilot pin 24 is press-fitted into the center hole 21A of the valve member 21, whereby the main valve 23 is held between the large diameter portion 24A and the valve member 21.

The other end side (right end side in FIGS. 1 and 2) of the pilot pin 24 is fitted in a center hole 26C of the pilot body 26. In this state, a fluid passage 25 extending in the axial direction is formed between the center hole 26C of the pilot body 26 and the other end side of the pilot pin 24. The fluid passage 25 is in communication with a back pressure chamber 27 that is formed between the main valve 23 and the pilot body 26. In other words, a plurality of axially extending fluid passages 25 are circumferentially provided in a lateral surface on the other end side of the pilot pin 24, and other circumferential regions on the other end side of the pilot pin 24 are press-fitted in the center hole 26C of the pilot body 26.

The pilot body 26 is formed into a substantially bottomed cylinder-like element and includes a cylindrical portion 26A with a stepped hole formed inside and a bottom portion 26B closing the cylindrical portion 26A. The bottom portion 26B of the pilot body 26 is provided with the center hole 26C in which the other end side of the pilot pin 24 is fitted. On one end side (left end side in FIGS. 1 and 2) of the bottom portion 26B of the pilot body 26, a protruding tube portion 26D is integrally provided at an outer diameter side over the whole circumference. The protruding tube portion 26D protrudes toward the valve member 21 side. The elastic seal member 23A of the main valve 23 is fitted in an inner peripheral surface of the protruding tube portion 26D in a liquid tight manner, to thereby form the back pressure chamber 27 between the main valve 23 and the pilot body 26. The back pressure chamber 27 generates pressure (inner pressure, pilot pressure) pushing the main valve 23 in a valve-closing direction, that is, in such a direction that the main valve 23 is seated on the annular valve seat 21D of the valve member 21.

A valve seat portion 26E is provided on the other end side (right end side in FIGS. 1 and 2) of the bottom portion 268 of the pilot body 26 to surround the center hole 26C. The pilot valve element 32 is seated on and unseated from the valve seat portion 26E. Arranged inside the cylindrical portion 26A of the pilot body 26 are a return spring 28 configured to bias the pilot valve element 32 in a direction away from the valve seat portion 26E of the pilot body 26, a disc valve 29 configuring a fail-safe valve for a situation where the solenoid 33 is not being energized (when the pilot valve element 32 is farthest from the valve seat portion 26E), a holding plate 30 in which a fluid passage 30A is formed at a center side, and other like elements.

A cap 31 is fixed to an open end of the cylindrical portion 26A of the pilot body 26 in a fitted manner with the return spring 28, the disc valve 29, the holding plate 30 and the like arranged inside the cylindrical portion 26A. Four notches 31A are formed in the cap 31, for example, at intervals in a circumferential direction. As shown by arrow X in FIG. 2, the notches 31A function as flow paths that allow the oil liquid sent to the solenoid 33 side through the fluid passage 30A of the holding plate 30 to flow into the fluid chamber 19C (reservoir chamber A side).

The pilot valve element 32 configures a pilot valve (control valve) in consort with the pilot body 26. The pilot valve element 32 is formed into a stepped cylinder-like shape. A distal end portion of the pilot valve element 32, that is, the distal end portion seated on and unseated from the valve seat portion 26E of the pilot body 26 has a tapered shape which becomes narrower towards the distal end. The actuating pin 49 of the solenoid 33 is fixed inside the pilot valve element 32 in a fitted manner. Valve-opening pressure of the pilot valve element 32 is adjusted according to current applied to the solenoid 33. The pilot valve (pilot body 26 and pilot valve element 32) as a control valve is thus controlled by displacement of the actuating pin 49 (namely, armature 48) of the solenoid 33. A flange portion 32A is formed at a proximal end side of the pilot valve element 32 over the whole circumference. The flange portion 32A functions as a spring bearing. The flange portion 32A configures a fail-safe valve by coming into abutment against an inner peripheral portion of the disc valve 29 while the solenoid 33 is not being energized, that is, when the pilot valve element 32 is displaced to a fully open position, at which the pilot valve element 32 is farthest from the valve seat portion 26E.

Figure 3:
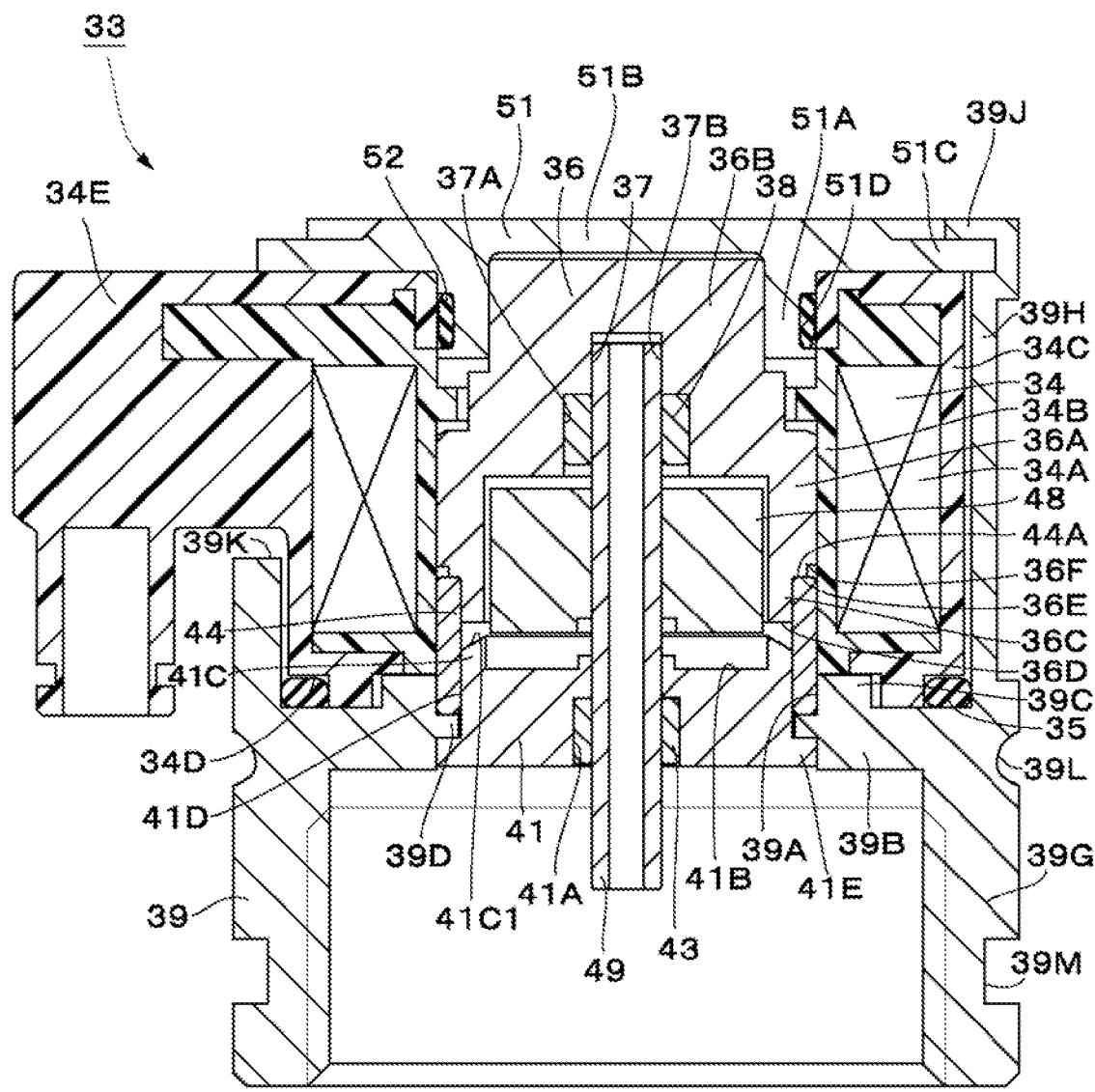
FIG. 3 is an enlarged sectional view focusing on the solenoid shown in FIG. 1.
Figure 4:
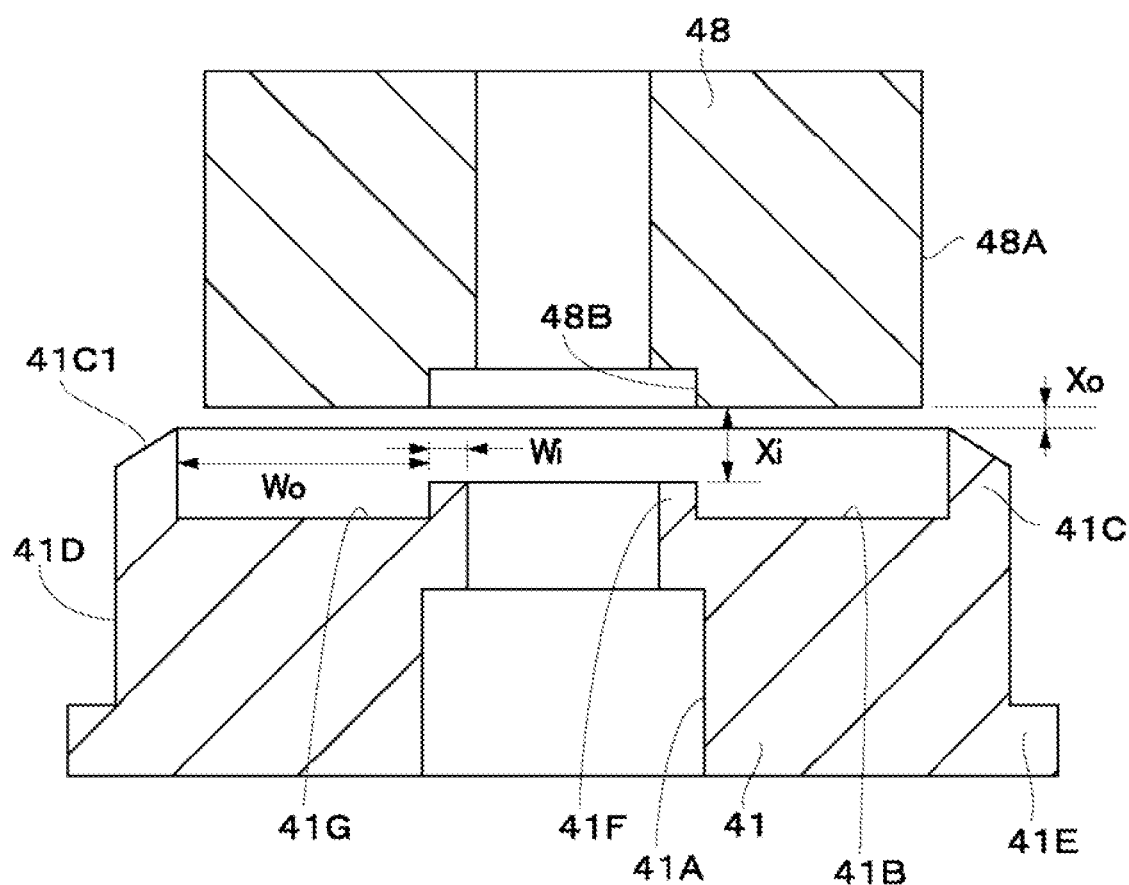
FIG. 4 is an enlarged sectional view focusing on a stator (anchor) and a mover (armature) shown in FIG. 1.

The following discussion explains the solenoid 33 configuring the damping force adjustment mechanism 17 in consort with the damping force adjustment valve 18 with reference with FIGS. 3 and 4 as well as FIGS. 1 and 2. FIG. 3 shows the solenoid 33 with the right side in FIG. 2 turned to the upper side and provided with reference signs. Accordingly, the horizontal direction in FIGS. 1 and 2 corresponds to the vertical direction in FIGS. 3 and 4.

The solenoid 33 is installed in the damping force adjustment mechanism 17 as a variable damping force actuator of the damping force adjustment mechanism 17. In other words, the solenoid 33 is used in a damping force adjustable shock absorber to adjust the valve-opening/closing operation of the damping force adjustment valve 18. The solenoid 33 includes a mold coil 34, a housing 36 as an accommodating member, the yoke 39, an anchor 41 as a stator, a cylinder 44 as a joining member (non-magnetic ring), the armature 48 as a mover (movable iron core), the actuating pin 49, and a cover member 51.

The mold coil 34 is formed into a substantially cylindrical shape by integrally covering (mold-forming) the coil 34A and a coil bobbin 34B with a resin member 34C, such as thermosetting resin, in a state where the coil 34A is wound around the coil bobbin 343. Provided in a part of the mold coil 34 in a circumferential direction is a cable draw-out portion 34E protruding axially or radially outwards. The cable draw-out portion 34E is connected with an electric wire cable, not shown. The coil 34A of the mold coil 34 is wound around the coil bobbin 34B in an annular form and functions as an electromagnet to generate magnetic force by external electric power supply (energization) through the cable.

A seal groove 34D is formed over the whole circumference in a lateral surface (one axial side end surface) of the resin member 34C of the mold coil 34, which faces the yoke 39 (annular portion 39B). Placed inside the seal groove 34D is a seal member (O-ring 35, for example). The O-ring 35 liquid-tightly seals space between the mold coil 34 and the yoke 39 (annular portion 39B). It is therefore possible to prevent dust containing rain water or mud water from entering the tubular projecting portion 39C side of the yoke 39 through the space between the yoke 39 and the mold coil 34.

The coil employed in the present embodiment is not limited to the mold coil 34 comprising the coil 34A, the coil bobbin 34B, and the resin member 34C but may be another coil. For example, the coil may be so configured that the outer periphery thereof is covered with an overmold, not shown, which is produced by molding a resin material over (from an outer peripheral side of) the coil in a state where the coil is wound around a coil bobbin made of electric insulating material.

The housing 36 configures a first fixed iron core (accommodating member) that is provided at an inner peripheral side of the mold coil 34 (that is, an inner periphery of the coil 34A). The housing 36 is formed as a tube element in the shape of a cylinder with a lid, which is made of magnetic material (magnetic element), such as low-carbon steel and mechanical structural carbon steel (S10C). The housing 36 is configured by including an accommodating tube portion 36A as an accommodating portion that extends in a winding axis direction of the mold coil 34 (coil 34A) and is open at one end side (the left side in FIG. 2, the lower side in FIG. 3), a stepped lid portion 36B closing the other end side (the right side in FIG. 2, the upper side in FIG. 3) of the accommodating tube portion 36A, and the small diameter tube portion 36C for joining which is formed at an opening side (one side) of the accommodating tube portion 36A so as to reduce the outer periphery of the opening in diameter.

The inner periphery of the cylinder 44 is joined to the outer periphery of the small diameter tube portion 36C of the housing 36 by brazing. The accommodating tube portion 36A of the housing 36 is so formed that an inner diameter dimension thereof is slightly larger than an outer diameter dimension of the armature 48. The armature 48 is accommodated in the accommodating tube portion 36A in an axially movable manner. In other words, the housing 36 opens at one axial end side, and the armature 48 is accommodated therein. The accommodating tube portion 36A of the housing 36 includes a first end portion 36D, a second end portion 36E, and a third end portion 36F in the order from the inner periphery at the open end (in the order from the inner diameter side toward the outer diameter side).

The first end portion 36D faces the anchor 41, or more specifically, an outer peripheral convex portion 41C (reduced diameter portion 41C1) of the anchor 41. The first end portion 36D configures a magnetic flux transmitting portion for transmitting a magnetic flux with the armature 48. The second end portion 36E is in abutment against the other end 44A of the cylinder 44 in the axial direction. The second end portion 36E abuts against the other end 44A of the cylinder 44, to thereby configure a position fixing portion used for alignment (positioning) of the housing 36. The third end portion 36F faces the other end 44A of the cylinder 44 with space therebetween. The space is a solder accommodating portion in which solder (copper ring) as sealing material is accommodated. The housing 36 (small diameter tube portion 36C) is press-fitted inside the cylinder 44, and brazing is applied, whereby the housing 36 and the cylinder 44 form a pressure container.

The lid portion 36B of the housing 36 is integrally formed in the accommodating tube portion 36A as a tube element with a lid which closes the accommodating tube portion 36A from the other axial side. The lid portion 36B has a stepped shape having smaller outer diameter than the accommodating tube portion 36A. A fitted tube portion 51A of the cover member 51 is fitted onto an outer peripheral side of the lid portion 36B. A bottomed, stepped hole 37 is formed in the housing 36 to be located at an inner side of the lid portion 36B. The stepped hole 37 comprises a bush attachment hole portion 37A and a small diameter hole portion 37B that is located further back than the bush attachment hole portion 37A and formed to have small diameter. Provided inside the bush attachment hole portion 37A is a first bush 38 for supporting the actuating pin 49 in a slidable manner.

The other side end surface of the lid portion 36B of the housing 36 is arranged to face a lid plate 51B of the cover member 51 with an axial space therebetween. The axial space functions to prevent axial force from being applied directly onto the housing 36 from the lid plate 51B side of the cover member 51 through the lid portion 36B. The lid portion 36B of the housing 36 does not necessarily have to be integrally formed of the same material (magnetic element) as the accommodating tube portion 36A. The lid portion 36B in this case may be formed, for example, of a rigid metal material, ceramic material or fiber reinforced resin material, instead of magnetic material. A join between the accommodating tube portion 36A and the lid portion 36B of the housing 36 is positioned in consideration of transmission of a magnetic flux.

The yoke 39 is provided at one axial side of the armature 48. The yoke 39 is a magnetic member that forms, in consort with the housing 36, a magnetic circuit (magnetic path) over the inner and the outer peripheral side of the mold coil 34 (coil 34A). The yoke 39, like the housing 36, is formed using magnetic material (magnetic element). The yoke 39 is configured by including the annular portion 39B radially extending at one axial side (one side in the winding axis direction) of the mold coil 34 (coil 34A) and formed into a stepped fixing hole 39A on the inner peripheral side, and the tubular projecting portion 39C protruding from the inner peripheral side of the annular portion 39B toward the other axial side (coil 34A side) of the mold coil 34 to have a tubular shape along the axial direction of the fixing hole 39A. The tubular projecting portion 39C configures a joining projection (tube portion) to be joined to the cylinder 44. The cylinder 44 is inserted in the inner diameter side of the tubular projecting portion 39C.

In other words, the yoke 39 includes the fixing hole 39A, and an inner peripheral surface of the fixing hole 39A faces a part of a lateral surface portion 41D of the anchor 41. Provided inside the fixing hole 39A over the whole circumference is an inwardly flanged portion 39D protruding toward an inner diameter side. One axial side end surface (one end surface) of the cylinder 44 abuts against a lateral surface (lateral surface at the coil 34A side) of the inwardly flanged portion 39D. The outer periphery of the one axial side of the cylinder 44 is fitted to the inner periphery of the yoke 39, namely, an inner surface of the fixing hole 39A (that is, the inner peripheral surface of the tubular projecting portion 39C).

The yoke 39 is formed as an integral object including a one side tube portion 39G in a cylindrical shape, which extends from an outer peripheral side of the annular portion 39B toward the one axial side (the damping force adjustment valve 18 side), the other side tube portion 39H extending from the outer peripheral side of the annular portion 39B toward the other axial side (the cover member 51 side) and formed so as to surround the mold coil 34 from radially outside, and a swaged portion 39J provided at a distal end side of the other side tube portion 39H to hold a flanged portion 51C of the cover member 51 in a non-slip state (or to prevent the flanged portion 51C of the cover member 51 from being detached off). Provided in the other side tube portion 39H of the yoke 39 is a notch 39K for exposing the cable draw-out portion 34E of the mold coil 34 outside the other side tube portion 39H.

An engaging concave portion 39L is provided between the one side tube portion 39G and the other side tube portion 39H of the yoke 39 (over the whole circumference or at a plurality of places at circumferential intervals). The engaging concave portion 39L is formed to have a semicircular cross-section so as to open in an outer peripheral surface of the yoke 39. The lock nut 53 screwed into the valve case 19 of the damping force adjustment valve 18 is engaged with the engaging concave portion 39L with a non-slip ring 54 (see FIG. 2) intervening therebetween. A seal groove 39M is provided in an outer peripheral surface of the one side tube portion 39G over the whole circumference. An O-ring 40 (see FIG. 2) as a seal member is placed in the seal groove 39M. The O-ring 40 seals space between the yoke 39 (one side tube portion 39G) and the valve case 19 of the damping force adjustment valve 18 in a liquid tight manner.

The anchor 41 is provided at one side in the moving direction of the armature 48. The anchor 41 is arranged to face the armature 48. The anchor 41 is a second fixed iron core (stator) that is fixed inside the fixing hole 39A of the yoke 39 by means such as press-fitting. Like the housing 36 (first fixed iron core) and the yoke 39, the anchor 41 is formed of magnetic material (magnetic element), such as low-carbon steel and mechanical structural carbon steel (S10C), to have such a shape as to fill the fixing hole 39A of the yoke 39 from inside. The anchor 41 is formed as an annular element having a short cylinder-like shape, a central region of which is a through-hole 41A extending in the axial direction. A one axial side surface (a surface that axially faces the cap 31 of the damping force adjustment valve 18 illustrated in FIG. 2) of the anchor 41 is formed into a flat surface as well as a one side surface of the annular portion 39B of the yoke 39.

A circular concave indent portion 41B is provided in the form of a recess on the other axial side (the other side surface that axially faces the armature 48) of the anchor 41 to be coaxial with the accommodating tube portion 36A of the housing 36. The concave indent portion 41B is formed as a circular groove having a slightly larger diameter than the armature 48 to allow the armature 48 to be inserted therein in such a manner that the armature 48 may come into and out of the concave indent portion 41B by magnetic force. Accordingly, the outer peripheral convex portion 41C having a cylindrical shape is provided on the other side of the anchor 41. An outer peripheral surface on an open side of the outer peripheral convex portion 41C is formed into a circular cone-shaped surface so that magnetic characteristics are linear (straight) between the anchor 41 and the armature 48.

In other words, the outer peripheral convex portion 41C that is also referred to as a corner portion protrudes from an outer peripheral side of the anchor 41 toward the other axial side to have a cylindrical shape. The outer peripheral surface (outer peripheral surface at the open side) of the outer peripheral convex portion 41C is a conical surface inclined to have a tapered shape so that an outer diameter dimension thereof gradually decreases toward the other axial side (open side). More specifically, the outer peripheral convex portion 41C of the anchor 41 includes a reduced diameter portion 41C1 that is provided in such a position as to face an opening (or more specifically, the first end portion 36D) of the housing 36 (accommodating tube portion 36A). An outer diameter of the reduced diameter portion 41C1 decreases toward the opening of the accommodating tube portion 36A.

The lateral surface portion 411D is formed on the outer peripheral side of the anchor 41. The lateral surface portion 41D extends along the outer periphery of the outer peripheral convex portion 41C in a direction away from the opening of the accommodating tube portion 36A of the housing 36. An end portion of the lateral surface portion 41D which is located on a side away from the opening of the accommodating tube portion 36A is an annular flange portion 41E protruding radially outwards. The annular flange portion 41E is arranged at a position that is widely away from an open end of the accommodating tube portion 36A of the housing 36 toward one axial side (that is, arranged in an opposite-side end portion to the concave indent portion 41B).

The annular flange portion 41E is fixed, for example, inside the fixing hole 39A of the yoke 39 by means such as press-fitting. The annular flange portion 41E is a fixed portion of the anchor 41 (lateral surface portion 41D) with respect to the fixing hole 39A of the yoke 39, and also is a portion facing the fixing hole 39A in the radial direction. The lateral surface portion 41D (except the annular flange portion 41E) of the anchor 41 faces an inner peripheral surface of the cylinder 44 and an inner surface of the inwardly flanged portion 39D of the yoke 39 leaving space (radial space) between the lateral surface portion 41D on one hand and the inner peripheral surface of the cylinder 44 and the inner surface of the inwardly flanged portion 39D on the other.

The anchor 41 comprises the outer peripheral convex portion 41C and the lateral surface portion 41D which are integrally formed by a magnetic element. The anchor 41 is provided in such a position as to face the opening of the accommodating tube portion 36A of the housing 36. The outer peripheral convex portion 41C protrudes toward the opening of the accommodating tube portion 36A of the housing 36. The lateral surface portion 41D extends from the outer periphery of the outer peripheral convex portion 41C in a direction away from the opening of the accommodating tube portion 36A of the housing 36. The lateral surface portion 41D is arranged leaving space between itself on one hand and the inner peripheral surface of the cylinder 44 and the inner surface of the inwardly flanged portion 39D of the yoke 39 on the other.

As illustrated in FIG. 3, a second bush 43 for slidably supporting the actuating pin 49 is fitted in the stepped through-hole 41A that is formed at the center (inner periphery) side of the anchor 41. As illustrated in FIG. 2, the pilot body 26, the return spring 28, the disc valve 29, the holding plate 30, the cap 31 and the other elements of the damping force adjustment valve 18 are inserted in an inner peripheral side of the one side tube portion 39G of the yoke 39. The valve case 19 of the damping force adjustment valve 18 is fitted to (fitted over) an outer peripheral side of the one side tube portion 39G.

The cylinder 44 is provided between the yoke 39 and the anchor 41 with respect to the radial direction. The cylinder 44 is provided between the yoke 39 and the housing 36 with respect to the axial and radial directions. In other words, the cylinder 44 is a non-magnetic joint member (joining member) that is provided at the inner peripheral side of the mold coil 34 (coil 34A) to be located between the small diameter tube portion 36C of the housing 36 and the tubular projecting portion 39C of the yoke 39. The cylinder 44 comprises a non-magnetic element. To be more specific, the cylinder 44 is formed into a cylindrical element (mere cylindrical element) using non-magnetic material, such as austenitic stainless steel.

The outer periphery of the cylinder 44 on one end side (yoke 39 side) in the winding axis direction of the mold coil 34 (coil 34A) is joined to the inner periphery of the yoke 39 (fixing hole 39A, tubular projecting portion 39C). The cylinder 44 is fixed to the yoke 39, one axial side of which functions as a stator. The inner periphery of the cylinder 44 on the other end side (housing 36 side) in the winding axis direction of the mold coil 34 (coil 34A) is joined to the outer periphery of the housing 36 (small diameter tube portion 36C). In other words, the cylinder 44 is fitted (press-fitted) onto the outer side (outer peripheral side) of the small diameter tube portion 36C of the housing 36. The cylinder 44 and the small diameter tube portion 36C are joined together by brazing.

According to the embodiment, the cylinder 44 is joined to the housing 36 and the yoke 39 with solder. The solder may be, for example, pure copper solder. That is, brazing may be performed using solder (copper ring) containing pure copper solder through brazing processing, for example, at a temperature of 1000° C. or higher. Instead of pure copper solder, the solder may be, for example, brass solder, nickel solder, gold solder, palladium solder or another solder. In any case, the cylinder 44 is joined to the small diameter tube portion 36C of the housing 36 and the tubular projecting portion 39C of the yoke 39 by brazing.

The armature 48 is arranged between the accommodating tube portion 36A of the housing 36 and the concave indent portion 41B of the anchor 41. The armature 48 is a mover comprising a magnetic element that is provided so as to be movable in the winding axis direction of the coil 34A. The armature 48 is arranged on the inner peripheral side of the accommodating tube portion 36A of the housing 36, the concave indent portion 41B of the anchor 41, the tubular projecting portion 39C of the yoke 39, and the cylinder 44. The armature 48 is axially movable between the accommodating tube portion 36A of the housing 36 and the concave indent portion 41B of the anchor 41. In other words, the armature 48 is arranged on the inner peripheral side of the accommodating tube portion 36A of the housing 36 and the concave indent portion 41B of the anchor 41 and is axially movable through the first and second bushes 38 and 43 and the actuating pin 49 by magnetic force generated in the coil 34A.

The armature 48 is provided fixedly to (integrally with) the actuating pin 49 extending through the center of the armature 48 and moves with the actuating pin 49. The actuating pin 49 is slidably supported in the axial direction by the lid portion 36B of the housing 36 and the anchor 41 through the first and second bushes 38 and 43. The armature 48 is formed of an iron-based magnetic element to have a substantially cylindrical shape, for example, like the housing 36, the yoke 39, and the anchor 41. In the armature 48, thrust force (attractive force) is generated by magnetic force generated in the coil 34A. The thrust force acts in a direction of being attracted or absorbed into the concave indent portion 41B of the anchor 41.

The actuating pin 49 is a shaft portion that transmits the thrust force of the armature 48 to the pilot valve element 32 of the damping force adjustment valve 18 (control valve). The actuating pin 49 is formed of a hollow rod. The armature 48 is integrally fixed to an axially middle portion of the actuating pin 49 by means such as press-fitting. The armature 48 and the actuating pin 49 are thus sub-assembled. The actuating pin 49 is slidably supported at each axial side by the lid portion 36B on the housing 36 side and the yoke 39 (anchor 41) through the first and second bushes 38 and 43.

One end side (left-side end portion in FIG. 2, lower end portion in FIG. 3) of the actuating pin 49 axially protrudes from the anchor 41 (yoke 39). The pilot valve element 32 of the damping force adjustment valve 18 is fixed to a protruding end on the one end side of the actuating pin 49. The pilot valve element 32 therefore moves in the axial direction together with the armature 48 and the actuating pin 49 in an integral manner. In other words, a preset valve-opening pressure of the pilot valve element 32 is a pressure value corresponding to the thrust force of the armature 48 based on current applied to the coil 34A. The armature 48 is moved in the axial direction by the magnetic force from the coil 34A, to thereby open/close the pilot valve (namely, the pilot valve element 32 with respect to the pilot body 26) of the shock absorber 1.

The cover member 51 is a magnetic element cover that covers the mold coil 34 from outside in consort with the other side tube portion 39H of the yoke 39. The cover member 51 is formed of magnetic material (magnetic element) as a lid element that covers the mold coil 34 from the other axial side and forms a magnetic circuit (magnetic path) outside the mold coil 34 (coil 34A) in consort with the other side tube portion 39H of the yoke 39. The cover member 51 is formed into a tube with a lid as a whole. The cover member 51 is generally configured by the cylindrical fitted tube portion 51A and the lid plate 51B having a circular plate-like shape which closes the other end side (right-side end portion in FIG. 2, upper end portion in FIG. 3) of the fitted tube portion 51A.

The fitted tube portion 51A of the cover member 51 is configured to be fitted over an outer periphery of the lid portion 36B of the housing 36 and, in this state, accommodate the lid portion 36B of the housing 36 in the inside. The lid plate 51B of the cover member 51 is so configured that an outer peripheral side thereof is the annular flanged portion 51C extending radially outside the fitted tube portion 51A. An outer peripheral edge of the flanged portion 51C is fixed to the swaged portion 39J provided in the other side tube portion 39H of the yoke 39. The other side tube portion 39H of the yoke 39 and the lid plate 51B of the cover member 51 are thus preliminarily assembled (sub-assembled) together with the mold coil 34 built-in on the inside as illustrated in FIG. 3.

In the state where the mold coil 34 is built-in on the inside of the other side tube portion 39H of the yoke 39 and the lid plate 51B of the cover member 51 as described above, the lid portion 368 of the housing 36 is fitted inside the fitted tube portion 51A of the cover member 51. This enables transmission of a magnetic flux between the fitted tube portion 51A and the lid plate SIB of the cover member 51 on one hand and the yoke 39 on the other. The resin member 34C of the mold coil 34 is fitted on an outer peripheral side of the fitted tube portion 51A of the cover member 51, and a seal groove 51D is formed in the outer peripheral side over the whole circumference. A seal member (O-ring 52, for example) is placed in the seal groove 51D. The O-ring 52 seals space between the mold coil 34 and the cover member 51 (fitted tube portion 51A) in a liquid tight manner. This prevents dust containing rain water or mud water from entering through the space between the cover member 51 and the mold coil 34 into space between the housing 36 and the mold coil 34, space between the housing 36 and the cover member 51, and other like space.

The yoke 39 and the cover member 51 are fastened, with the mold coil 34 built-in on the inside as illustrated in FIG. 3, to the valve case 19 of the damping force adjustment valve 18 using the lock nut 53 and the non-slip ring 54 as fastening members as illustrated in FIG. 2. In such a case, the non-slip ring 54 is attached to the engaging concave portion 39L of the yoke 39 prior to the attachment of the lock nut 53. The non-slip ring 54 partially protrudes from the engaging concave portion 39L of the yoke 39 in the radially outward direction. The non-slip ring 54 is configured to transmit fastening force of the lock nut 53 to the one side tube portion 39G of the yoke 39.

The lock nut 53 is formed into a stepped tubular element. The lock nut 53 is provided with an internal thread portion 53A and an engaging tube portion 53B. The internal thread portion 53A is located at one axial side of the lock nut 53 and threadedly engaged with an external thread portion 19B of the valve case 19 at an inner peripheral side. The engaging tube portion 53B is bent radially inwards to have an inner diameter dimension that is smaller than an outer diameter dimension of the non-slip ring 54. The engaging tube portion 53B is engaged with the non-slip ring 54 from outside. The lock nut 53 is a fastening member for integrally joining the damping force adjustment valve 18 and the solenoid 33 by threadedly engaging the internal thread portion 53A with the external thread portion 19B of the valve case 19 with an inner surface of the engaging tube portion 53B abutting against the non-slip ring 54 placed in the engaging concave portion 39L of the yoke 39.

Patent Literature 1 mentioned above includes an electromagnetic device comprising a stator provided with an inner convex portion and an outer convex portion. In this case, "axial distance between the inner convex portion of the stator and a mover" and "axial distance between the outer convex portion of the stator and the mover" are designed to be equal. According to the electromagnetic device of Patent Literature 1, therefore, the peaks of the forces generated in top portions of the stator and the mover with respect to the stroke of the mover are the same. This makes it difficult to secure the stability and controllability of thrust force of the mover.

To solve the foregoing problem, according to the embodiment, the shapes of the anchor 41 and the armature 48, which are components where magnetic force is concentrated on, are carefully designed to secure the stability and controllability of thrust force and improve the thrust force. To be specific, as illustrated in FIG. 4, according to the embodiment, the outer peripheral convex portion 41C having an annular shape and an inner peripheral convex portion 41F having an annular shape are formed in the anchor 41. The outer peripheral convex portion 41 is located radially outside and protrudes in the axial direction toward the armature 48 side. The inner peripheral convex portion 41F is located radially inside and protrudes in the axial direction toward the armature 48 side.

An outer peripheral portion of the armature 48, that is, an outer peripheral portion of the mover which is radially closest to the outer peripheral convex portion 41C of the anchor 41 is an outer peripheral portion 48A of the armature 48, and an inner peripheral portion of the armature 48, that is, an inner peripheral portion of the mover which is radially closest to the inner peripheral convex portion 41F of the anchor 41 is an inner peripheral portion 48B of the armature 48. Axial distance from the outer peripheral convex portion 41C of the anchor 41 to the outer peripheral portion 48A of the armature 48 is Xo, and axial distance from the inner peripheral convex portion 41F of the anchor 41 to the inner peripheral portion 48B of the armature 48 is Xi. In this case, when current is not applied, the axial distance Xo is smaller than the axial distance Xi (Xo<Xi).

Figure 5:
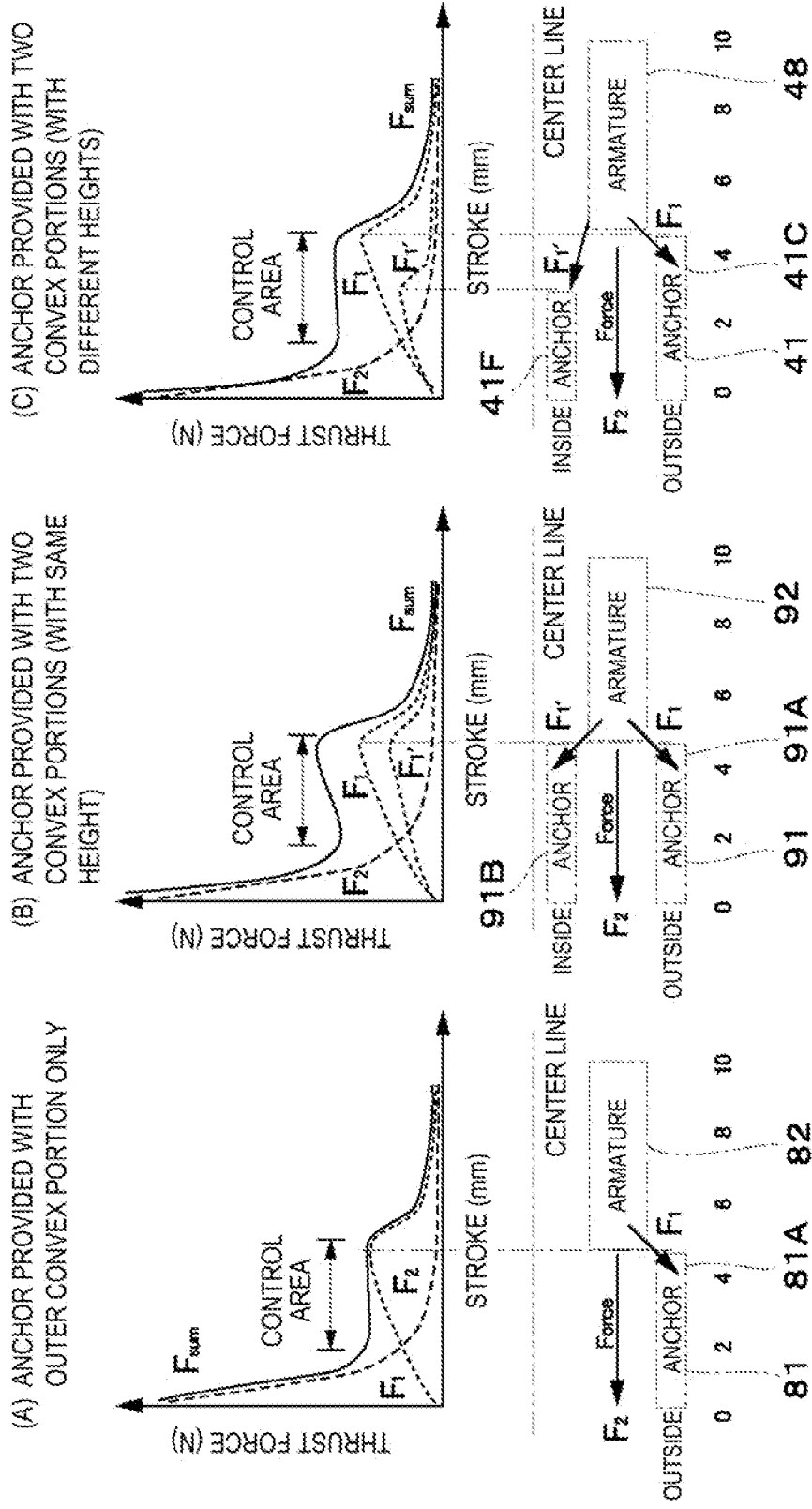
FIG. 5 shows three examples of relationship of the mover's strokes and thrust force in the form of characteristic curve graphs which includes (A) showing a case where a convex portion is formed only on an outer diameter side, (B) showing a case where a convex portion on an inner diameter side and a convex portion on an outer diameter side are equal in height, and (C) showing a case where a convex on an inner diameter side and a convex portion on an outer diameter side are different in height.

According to the embodiment, more specifically, when no current is being applied, the axial distance Xo to the outer peripheral portion 48A of the armature 48 is smaller than the axial distance Xi to the inner peripheral portion 48B of the armature 48. In other words, the timing at which the outer peripheral convex portion 41C of the anchor 41 and the outer peripheral portion 48A of the armature 48 face each other in the radial direction is shifted from the timing at which the inner peripheral convex portion 41F of the anchor 41 and the inner peripheral portion 48B of the armature 48 face each other in the radial direction. In this case, when the armature 48 approaches the anchor 41, the outer peripheral convex portion 41C of the anchor 41 and the outer peripheral portion 48A of the armature 48 face each other in the radial direction, and then, the inner peripheral convex portion 41F of the anchor 41 and the inner peripheral portion 48B of the armature 48 face each other in the radial direction, FIG. 5 shows relationships of movers' (armatums') stroke and thrust force. FIG. 5(A) shows as a comparative example A the relationship of stroke and thrust force of an armature 82 in a case where an anchor 81 is provided with an outer peripheral convex portion 81A only. FIG. 5(B) shows as a comparative example B the relationship of stroke and thrust force of an armature 92 in a case where an anchor 91 is provided with an outer peripheral convex portion 91A and an inner peripheral convex portion 91B, which are designed to have the same height (axial distance to the armature 92). FIG. 5(C) shows as an embodiment the relationship of stroke and thrust force of the armature 48 in a case where the anchor 41 is so designed that the outer peripheral convex portion 41C and the inner peripheral convex portion 41F differs in height (axial distances Xo, Xi).

In FIG. 5, "F1" represents thrust force (attractive force) generated between the outer peripheral convex portion of the anchor and the armature; "F1'" represents thrust force (attractive force) generated between the inner peripheral convex portion of the anchor and the armature; "F2" represents thrust force (attractive force) generated between the concave indent portion (bottom portion) of the anchor and the armature; and "Fsum" represents a total thrust force (total attractive force) of the thrust forces generated between the anchor and the armature. FIG. 5 shows changes of "F1" and "F2" with broken lines as characteristic lines and changes of "Fsum" with solid lines.

As shown in FIG. 5(C), according to the embodiment, the peak of the attractive force F1 with respect to approach distance (stroke) between the outer peripheral convex portion 41C of the anchor 41 and the armature 48 differs from the peak of the attractive force F1' with respect to approach distance (stroke) between the inner peripheral convex portion 41F of the anchor 41 and the armature 48. According to the embodiment, therefore, it is possible to make the thrust force approximately constant relative to the stroke within a control area, that is, a range where the valve-opening pressure of the pilot valve element 32 functioning as a control valve is desired to be controlled. Especially in the embodiment, radial width Wo of an annular concave portion 41G located between the inner peripheral convex portion 41F and the outer peripheral convex portion 41C is set to be 1 to 95 times as large as radial width Wi of the inner peripheral convex portion 41F of the anchor 41 (Wi≤Wo≤95Wi).

Figure 6:
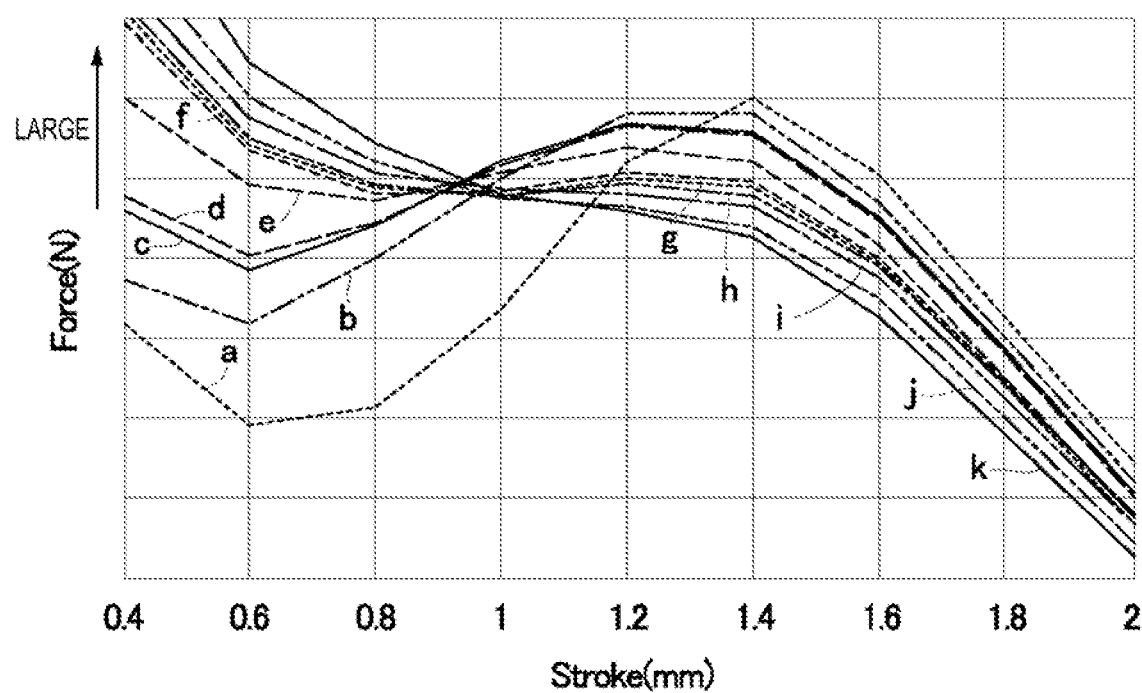
FIG. 6 is a characteristic curve graph showing 11 examples of relationship of the mover's strokes and thrust force, which are differentiated from one another in ratio of concave and convex portions.

FIG. 6 shows relationship of the stroke and thrust force of the mover (armature) in cases differentiated from one another in ratio of the width Wo of the concave portion 41G and the width Wi of the inner peripheral convex portion 41F. The figure shows 11 examples "a" to "k" of relationship between the stroke and the thrust force. FIG. 7 shows the ratios of the width Wo of the concave portion 41G and the width Wi of the inner peripheral convex portion 41F in the examples "a" to "k" and evaluations for "a" to "k." As shown in FIGS. 6 and 7, the thrust force can be made substantially constant relative to the stroke within the control area by setting the width Wo of the concave portion 41G to be 1 to 95 times as large as the width Wi of the inner peripheral convex portion 41F (Wi≤Wo≤95Wi).

The solenoid 33, the damping force adjustment mechanism 17, and the shock absorber 1 according to the present embodiment are configured as described above. The following discussion explains the operation thereof.

When the shock absorber 1 is mounted on a vehicle, such as an automobile, for example, the upper end side (protruding end side) of the piston rod 8 is attached to a vehicle body side of the vehicle, and the attachment eye 3A side provided to the bottom cap 3 is attached to a wheel side. The solenoid 33 of the damping force adjustment mechanism 17 is connected through an electric wiring cable or the like to a control device (controller), neither shown, which is provided to the vehicle body side of the vehicle.

During the driving of the vehicle, if vertical vibrations are generated due to irregularities in road surface or the like, the piston rod 8 is displaced to extend from and compress into the outer tube 2, so that damping force can be generated by the damping force adjustment mechanism 17 and the like, which makes it possible to absorb the vibrations of the vehicle. At this point of time, the generated damping force of the shock absorber 1 can be variably adjusted by controlling the value of the current applied to the coil 34A of the solenoid by means of the controller to adjust the valve-opening pressure of the pilot valve element 32.

For example, during the extension stroke of the piston rod 8, the compression-side check valve 7 of the piston 5 is closed by the motion of the piston 5 in the inner tube 4. Before the disc valve 6 of the piston 5 is opened, the oil liquid in the rod-side fluid chamber B is pressurized. The oil liquid then flows through the fluid hole 4A of the inner tube 4, the annular fluid chamber D, and the connecting port 12C of the middle tube 12 and enters the fluid passage 20B of the connecting pipe element 20 of the damping force adjustment valve 18. At this point of time, the oil liquid of amount corresponding to the motion of the piston 5 flows out of the reservoir chamber A, opens the extension-side check valve 16 of the bottom valve 13, and enters the bottom-side fluid chamber C. When the pressure in the rod-side fluid chamber B reaches the valve-opening pressure of the disc valve 6, the disc valve 6 is opened to relieve or release the pressure in the rod-side fluid chamber B into the bottom-side fluid chamber C.

In the damping force adjustment mechanism 17, before the main valve 23 is opened (low piston velocity area), the oil liquid that enters the fluid passage 20B of the connecting pipe element 20 flows through the center hole 21A of the valve member 21, the center hole 24B of the pilot pin 24, and the center hole 26C of the pilot body 26, pushes open the pilot valve element 32, and enters the inside of the pilot body 26 as shown by arrow X in FIG. 2. The oil liquid that enters the inside of the pilot body 26 flows into the reservoir chamber A through space between the flange portion 32A of the pilot valve element 32 and the disc valve 29, the fluid passage 30A of the holding plate 30, the notches 31A of the cap 31, and the fluid chamber 19C of the valve case 19. When the pressure in the fluid passage 20B of the connecting pipe element 20, that is, the pressure in the rod-side fluid chamber B reaches the valve-opening pressure of the main valve 23 in response to increase of the piston velocity, the oil liquid that enters the fluid passage 20B of the connecting pipe element 20 flows through the fluid passage 21B of the valve member 21, pushes open the main valve 23, and flows into the reservoir chamber A through the fluid chamber 19C of the valve case 19 as shown by arrow Y in FIG. 2.

During the compression stroke of the piston rod 8, the motion of the piston 5 in the inner tube 4 opens the compression-side check valve 7 of the piston 5 and closes the extension-side check valve 16 of the bottom valve 13. Before the bottom valve 13 (disc valve 15) is opened, the oil liquid in the bottom-side fluid chamber C enters the rod-side fluid chamber B. At the same time, the oil liquid of amount corresponding to the entry of the piston rod 8 in the inner tube 4 flows out of the rod-side fluid chamber B, passes the damping force adjustment valve 18, and enters the reservoir chamber A using the same route as during the extension stroke. When the pressure in the bottom-side fluid chamber C reaches the valve-opening pressure of the bottom valve 13 (disc valve 15), the bottom valve 13 (disc valve 15) is opened to relieve or release the pressure in the bottom-side fluid chamber C into the reservoir chamber A.

During the extension and compression strokes of the piston rod 8, accordingly, damping force is generated by the orifice 24C of the pilot pin 24 and the valve-opening pressure of the pilot valve element 32 before the main valve 23 of the damping force adjustment valve 18 is opened. After the main valve 23 is opened, damping force is generated according to the opening degree of the main valve 23, in this case, the damping force can be directly controlled, regardless of piston velocity, by adjusting the valve-opening pressure of the pilot valve element 32 through energization of the coil 34A of the solenoid 33.

Specifically, if the thrust force of the armature 48 is decreased by reducing the current applied to the coil 34A, the valve-opening pressure of the pilot valve element 32 is reduced, and a soft damping force is generated. If the thrust force of the armature 48 is increased by increasing the current applied to the coil 34A, the valve-opening pressure of the pilot valve element 32 is increased, and a hard damping force is generated. In this process, the inner pressure of the back pressure chamber 27 in communication with the pilot valve element 32 through the fluid passage 25 on the upstream side is changed by the valve-opening pressure of the pilot valve element 32. Accordingly, the valve-opening pressure of the main valve 23 can be adjusted at the same time by controlling the valve-opening pressure of the pilot valve element 32, which can enlarge an adjustment range of damping force characteristics.

If the thrust force of the armature 48 is lost due to disconnection of the coil 34A or for another reason, the pilot valve element 32 recedes (is displaced away from the valve seat portion 26E) due to the return spring 28, and the flange portion 32A of the pilot valve element 32 and the disc valve 29 abut against each other. In this state, damping force can be generated by the valve-opening pressure of the disc valve 29, so that necessary damping force can be obtained in the event of malfunction, such as disconnection of the coil.

According to the embodiment, the "distance Xo between the outer peripheral convex portion 41C of the anchor 41 and the outer peripheral portion 48A of the armature 48" and the "distance Xi between the inner peripheral convex portion 41F of the anchor 41 and the inner peripheral portion 48B of the armature 48" are different from each other. This means that the "timing at which the outer peripheral convex portion 41C of the anchor 41 and the outer peripheral portion 48A of the armature 48 face each other in the radial direction" and the "timing at which the inner peripheral convex portion 41F of the anchor 41 and the inner peripheral portion 48B of the armature 48 face each other in the radial direction" are different. This makes it possible to shift the peak of the force generated between the armature 48 and the outer peripheral convex portion 41C of the anchor 41 from the peak of the force generated between the armature 48 and the inner peripheral convex portion 41F of the anchor 41 with respect to the stroke of the armature 48.

Otherwise phrased, according to the embodiment, the "peak of the attractive force between the outer peripheral convex portion 41C of the anchor 41 and the armature 48" is shifted from the "peak of the attractive force between the inner peripheral convex portion 41F of the anchor 41 and the armature 48." This makes it possible to make the thrust force of the armature 48 (attractive force between the anchor 41 and the armature 48) approximately constant relative to the stroke within a range (control area) where the thrust force is desired to be constant (flat) relative to the stroke. Consequently, the stability and controllability of thrust force of the armature 48 can be secured. It is then possible to improve the characteristics (for example, valve-opening characteristics) of the pilot valve element 32 controlled by the displacement of the solenoid (armature 48), the characteristics (for example, valve-opening characteristics) of the main valve 23, and therefore the damping force characteristics of the shock absorber 1.

According to the embodiment, the radial width Wo of the concave portion 41G of the anchor 41 is 1 to 95 times as large as the radial width Wi of the inner peripheral convex portion 41F of the anchor 41. As shown in FIGS. 6 and 7, therefore, the thrust force of the armature 48 can be made substantially constant within the range where the thrust force of the armature 48 is desired to be constant. In such a case, if the ratio of the radial width Wo and Wi is smaller than 1 times (or more than 95 times), the fluctuation of the thrust force is increased within the range where the thrust force is desired to be substantially constant.

The embodiment is explained with an example of the case where the bottom portion of the concave portion 41G of the anchor 41 is formed into a flat surface. However, it is also possible, for example, as in a modification example shown in FIG. 8, to form an annular middle convex portion 62 in a concave portion 61, that is, between the outer peripheral convex portion 41C and the inner peripheral convex portion 41F of the anchor 41. In such a case, a protruding end of the middle convex portion 62 of the anchor 41 may be configured to include a flat surface. If the middle convex portion 62 is formed in the anchor 41, the middle convex portion 62 makes it possible to increase the thrust force within the range where the thrust force is desired to be substantially constant. Furthermore, if the protruding end of the middle convex portion 62 is provided with a flat surface, the middle convex portion 62 is allowed to have a larger cubic volume without changing the height of the middle convex portion 62, as compared to if the protruding end of the middle convex portion 62 has a pointed shape. It is therefore possible to reduce magnetic saturation and improve the thrust force.

Figure 8:
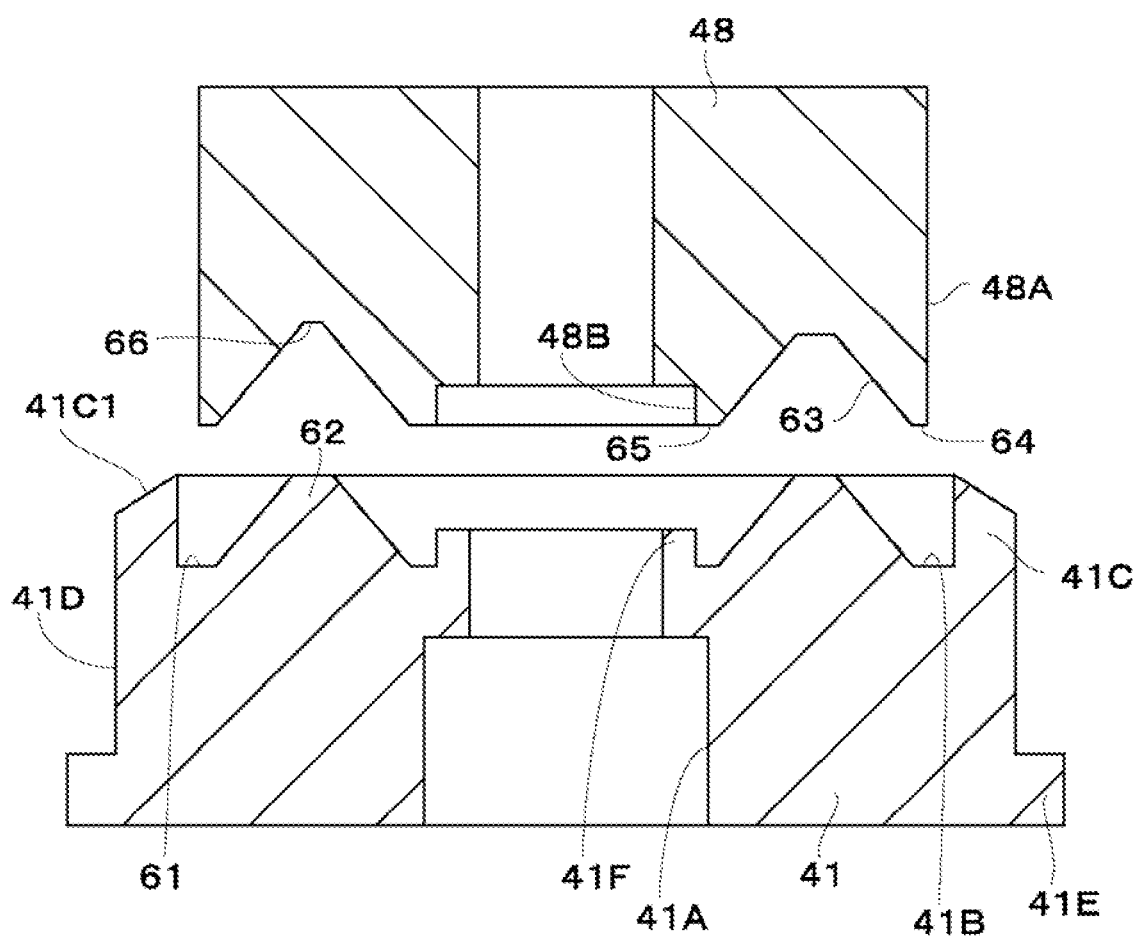
FIG. 8 is an enlarged sectional view of the same area as in FIG. 4, which shows a stator (anchor) and a mover (armature) according to a modification example.

As shown in FIG. 8, the armature 48 may be provided with an annular middle concave portion 63 corresponding to the middle convex portion 62 of the anchor 41. In such a case, the armature 48 may be so configured that an outer connecting portion 64 extending between the outer peripheral portion 48A of the armature 48 and an outer diameter side of the middle concave portion 63 and/or an inner connecting portion 65 extending between the inner peripheral portion 48B of the armature 48 and an inner diameter side of the middle concave portion 63 includes a flat surface. This configuration also makes it possible to increase flat surfaces and provide a larger cubic volume, as compared to if the outer connecting portion 64 and the inner connecting portion 65 each have a pointed shape. Consequently, magnetic saturation can be further reduced, which further improves the thrust force. In addition, a bottom portion 66 of the middle concave portion 63 of the armature 48 may have a flat surface. This also improves the magnetic saturation and the thrust force due to the flat surfaces and further can facilitate the processing of the middle concave portion 63 as the flat surface of the bottom portion 66 of the middle concave portion 63 serves as a flank face (or flank) for a cutting tool.

The embodiments and the modification example are explained with an example of the case where the housing 36 and the cylinder 44 are joined to the cylinder 44 and the yoke 39, respectively, by brazing. However, the invention does not necessarily have to be configured in the foregoing manner. For example, the housing 36 and the cylinder 44 may be jointed to the cylinder 44 and the yoke 39, respectively, by welding.

The embodiments and the modification example are explained with an example of the case where the anchor 41 is fixed inside the fixing hole 39A of the yoke 39 by press-fitting. However, the invention does not necessarily have to be configured in the foregoing manner and may be so configured that an anchor is fixed inside a yoke, for example, by screwing, swaging or other like means.

The embodiments and the modification example are explained with an example of the case where the anchor 41 and the yoke 39 are configured as separate elements (separate components). However, the invention does not necessarily have to be configured in the foregoing manner, and an anchor and a yoke may be configured, for example, as a single element (single component).

The embodiments and the modification example am explained with an example of the case where one side of the cylinder 44 is fixed to the yoke 39. However, the invention does not necessarily have to be configured in the foregoing manner and, for example, may be so configured that one side of a cylinder (joining member) is fixed to an anchor.

The embodiments and the modification example are explained with an example of the case where the yoke 39 is provided with the other side tube portion 39H, and the distal end side (other axial side) of the other side tube portion 39H is fixed to the outer peripheral side of the cover member 51 through the swaged portion 39J. However, the invention does not necessarily have to be configured in the foregoing manner. For example, the invention and may be so configured that an annular portion and the other side tube portion of a yoke are formed as separate elements, and the other side tube portion is formed integrally with a cover member.

The embodiments and the modification example are explained with an example of the case where the solenoid 33 is configured as a proportional solenoid. However, the invention does not necessarily have to be configured in the foregoing manner. The solenoid 33 may be configured, for example, as an on-off solenoid.

The embodiments and the modified example are explained with a multi-cylinder type shock absorber 1 comprising the outer tube 2 and the inner tube 4 taken as an example. However, the invention does not necessarily have to be configured in the foregoing manner. The invention may be used, for example, for a damping force adjustable shock absorber comprising a single cylinder type tube member (cylinder).

The embodiments and the modification example are explained with an example of the case where the solenoid 33 is used as a variable damping force actuator for the shock absorber 1, that is, where the pilot valve element 32 configuring the pilot valve of the damping force adjustment valve 18 is a target to be driven by the solenoid 33. However, the invention does not necessarily have to be configured in the foregoing manner. For example, a solenoid may be widely used as an actuator installed in every kind of mechanical device, such as a valve used in a hydraulic circuit, that is, a drive device that drives a driven target to be driven in a linear manner.

Solenoids, damping force adjustment mechanisms, and damping force adjustable shock absorbers based on the above-explained embodiments and modification example may include, for example, those according to the following modes.

A first mode provides a solenoid comprising a coil wound into an annular shape and configured to generate magnetic force by being energized, a mover comprising a magnetic element provided to be movable in a winding axis direction of the coil, and a stator arranged to face the mover. An outer peripheral convex portion and an inner peripheral convex portion are formed in the stator. When no current is being applied, axial distance between the outer peripheral convex portion of the stator and an outer peripheral portion of the mover which is radially closest to the outer peripheral convex portion is smaller than axial distance between the inner peripheral convex portion of the stator and an inner peripheral portion of the mover which is radially closest to the inner peripheral convex portion.

According to the first mode, "distance between the outer peripheral convex portion of the stator and the outer peripheral portion of the mover" and "distance between the inner peripheral convex portion of the stator and the inner peripheral portion of the mover" are different from each other. The peak of the force generated between the mover and the outer peripheral convex portion of the stator therefore can be shifted from the peak of the force generated between the mover and the mover and the inner peripheral convex portion of the stator with respect to the stroke of the mover. The thrust force of the mover (attractive force between the stator and the mover) can be made approximately constant relative to the stroke within a range (control area) where the thrust force is desired to be constant (flat) relative to the stroke. Consequently, the stability and controllability of thrust force of the mover can be secured.

In a second mode according to the first mode, radial width of a concave portion located between the inner peripheral convex portion and the outer peripheral convex portion is 1 to 95 times as large as radial width of the inner peripheral convex portion. According to the second mode, the thrust force of the mover can be made substantially constant within a range where the thrust force is desired to be constant. In this case, if a radial width ratio is smaller than 1 times (or more than 95 times), the fluctuation of the thrust force is increased in a range where the thrust force is desired to be substantially constant.

In a third mode according to the first or second mode, a middle convex portion is formed between the outer peripheral convex portion and the inner peripheral convex portion. According to the third mode, the middle convex portion makes it possible to increase the thrust force within the range where the thrust force is desired to be substantially constant.

In a fourth mode according to the third mode, a protruding end of the middle convex portion of the stator includes a flat surface. According to the fourth mode, the flat surface provides a larger cubic volume without changing the height of the middle convex portion, as compared to if the protruding end has a pointed shape. It is therefore possible to reduce magnetic saturation and improve the thrust force.

In a fifth mode according to the third or fourth mode, the mover is provided with a middle concave portion corresponding to the middle convex portion of the stator, and the solenoid includes a flat surface between the outer peripheral portion of the mover and an outer diameter side of the middle concave portion and/or between the inner peripheral portion of the mover and an inner diameter side of the middle concave portion. The fifth mode makes it possible to increase flat surfaces and thus provide a larger cubic volume, as compared to if the surface between the outer peripheral portion and the outer diameter side of the middle concave portion and the surface between the inner peripheral portion of the mover and the inner diameter side of the middle concave portion each have a pointed shape. It is therefore possible to reduce magnetic saturation and improve the thrust force.

In a sixth mode according to the fifth mode, a bottom portion of the middle concave portion of the mover includes a flat surface. According to the sixth mode, the flat surface makes it possible to improve magnetic saturation and thrust force and also facilitate the processing of the middle concave portion as the flat surface of the bottom portion of the middle concave portion serves as a flank face for a cutting tool.

A seventh mode provides a solenoid comprising a coil wound into an annular shape and configured to generate magnetic force by being energized, a mover comprising a magnetic element provided to be movable in a winding axis direction of the coil, and a stator arranged to face the mover. An outer peripheral convex portion and an inner peripheral convex portion are formed in the stator. A peak of attractive force with respect to approach distance between the outer peripheral convex portion and the mover differs from a peak of attractive force with respect to approach distance between the inner peripheral convex portion and the mover.

According to the seventh mode, the "peak of attractive force of the outer peripheral convex portion of the stator and the mover" and the "peak of attractive force of the inner peripheral convex portion of the stator and the mover" can be shifted from each other. It is therefore possible to make the thrust force of the mover (attractive force of the stator and the mover) approximately constant relative to the stroke within a range (control area) where the thrust force is desired to be constant (flat) relative to the stroke. Consequently, the stability and controllability of thrust force of the mover can be secured.

An eighth mode provides a solenoid comprising a coil wound into an annular shape and configured to generate magnetic force by being energized, a mover comprising a magnetic element provided to be movable in a winding axis direction of the coil, and a stator arranged to face the mover. An outer peripheral convex portion and an inner peripheral convex portion are formed in the stator. Timing at which the outer peripheral convex portion of the stator and an outer peripheral portion of the mover face each other in a radial direction is shifted from timing at which the inner peripheral convex portion of the stator and an inner peripheral portion of the mover face each other in the radial direction.

According to the eighth mode, the "timing at which the outer peripheral convex portion of the stator and the outer peripheral portion of the mover face each other in the radial direction" and the "timing at which the inner peripheral convex portion of the stator and the inner peripheral portion of the mover face each other in the radial direction" are different. It is therefore possible to shift the peak of the force generated between the mover and the outer peripheral convex portion of the stator from the peak of the force generated between the mover and the inner peripheral convex portion of the stator with respect to the stroke of the mover. The thrust force of the mover (attractive force of the stator and the mover) therefore can be made approximately constant relative to the stroke within the range (control area) where the thrust force is desired to be constant (flat) relative to the stroke. Consequently, the stability and controllability of thrust force of the mover can be secured.

A ninth mode provides a damping force adjustment mechanism comprising a coil wound into an annular shape and configured to generate magnetic force by being energized, a mover comprising a magnetic element provided to be movable in a winding axis direction of the coil, a stator arranged to face the mover, and a control valve controlled by motion of the mover. An outer peripheral convex portion and an inner peripheral convex portion are formed in the stator. When no current is being applied, axial distance between the outer peripheral convex portion of the stator and an outer peripheral portion of the mover which is radially closest to the outer peripheral convex portion is smaller than axial distance between the inner peripheral convex portion of the stator and an inner peripheral portion of the mover which is radially closest to the inner peripheral convex portion.

According to the ninth mode, as in the first mode, the thrust force (attractive force of the stator and the mover) of the solenoid (mover) can be made approximately constant relative to the stroke within the range (control area) where the thrust force is desired to be constant (flat) relative to the stroke. Consequently, the stability and controllability of thrust force of the mover can be secured. This makes it possible to improve characteristics (for example, valve-opening characteristics) of the control valve controlled by motion of the solenoid (mover).

A 10th mode provides a damping force adjustable shock absorber comprising a cylinder in which hydraulic fluid is sealingly contained, a piston that is slidably provided inside the cylinder, a piston rod that is coupled to the piston and extends outside the cylinder, and a damping force adjustment mechanism configured to generate damping force by controlling a hydraulic fluid flow generated by sliding motion of the piston in the cylinder. The damping force adjustment mechanism comprises a coil wound into an annular shape and configured to generate magnetic force by being energized, a mover comprising a magnetic element provided to be movable in a winding axis direction of the coil, a stator arranged to face the mover, and a control valve controlled by motion of the mover. An outer peripheral convex portion and an inner peripheral convex portion are formed in the stator. When no current is being applied, axial distance between the outer peripheral convex portion of the stator and an outer peripheral portion of the mover which is radially closest to the outer peripheral convex portion is smaller than axial distance between the inner peripheral convex portion of the stator and an inner peripheral portion of the mover which is radially closest to the inner peripheral convex portion.

According to the 10th mode, as in the first mode, the thrust force (attractive force of the stator and the mover) of the solenoid (mover) can be made approximately constant relative to the stroke within the range (control area) where the thrust force is desired to be constant (flat) relative to the stroke. Consequently, the stability and controllability of thrust force of the mover can be secured. This makes it possible to improve characteristics (for example, valve-opening characteristics) of the control valve controlled by motion of the solenoid (mover), and therefore damping force characteristics of the damping force adjustable shock absorber.

The invention is not limited to the above-discussed embodiments and may be modified in various ways. For example, the embodiments are intended to describe the invention in detail for easy understanding and do not necessarily have to include all the configurations mentioned above. The configuration of each embodiment may be partially replaced with another configuration or incorporated with another configuration. It is also possible to incorporate, omit or replace a part of the configuration of one of the embodiments into, from or with the configuration of another one of the embodiments.

The present application claims priority under Japanese Patent Application No. 2021-026852 filed on Feb. 23, 2021. The entire disclosure of Japanese Patent Application No. 2021-026852 filed on Feb. 23, 2021 including the description, claims, drawings and abstract, is incorporated herein by reference in its entirety.

REFERENCE SIGN LIST

1: Shock absorber (damping force adjustable shock absorber)
2: Outer tube (cylinder)
4: Inner tube (cylinder)
5: Piston
8: Piston rod
17: Damping force adjustment mechanism
32: Pilot valve element (control valve)
33: Solenoid
34A: Coil
41: Anchor (Stator)
41C: Outer peripheral convex portion
41F: Inner peripheral convex portion
41G, 61: Concave portion
48: Armature (mover)
48A: Outer peripheral portion of the armature (outer peripheral portion of the mover)
48B: Inner peripheral portion of the armature (inner peripheral portion of the mover)
62: Middle convex portion
63: Middle concave portion
64: Outer connecting portion (portion between the outer peripheral portion of the mover and the outer diameter side of the middle concave portion)
65: Inner connecting portion (portion between the inner peripheral portion of the mover and the inner diameter side of the middle concave portion)
66: Bottom portion
Xo, Xi: Axial distance
Wo, Wi: Radial width

The invention claimed is:
1. A solenoid comprising:
a coil wound into an annular shape and configured to generate magnetic force by being energized;
a mover comprising a magnetic element provided to be movable in a winding axis direction of the coil; and
a stator arranged to face the mover,
the stator in which an outer peripheral convex portion, an inner peripheral convex portion, and a concave indent portion located between the outer peripheral convex portion and the inner peripheral convex portion, the concave indent portion to which an opposed surface of the mover is substantially parallel are formed;
the mover and the stator being so configured that, when no current is being applied, axial distance between the outer peripheral convex portion of the stator and an outer peripheral portion of the mover which is radially closest to the outer peripheral convex portion is smaller than axial distance between the inner peripheral convex portion of the stator and an inner peripheral portion of the mover which is radially closest to the inner peripheral convex portion.

2. The solenoid according to claim 1,
wherein radial width of a concave portion located between the inner peripheral convex portion and the outer peripheral convex portion is 1 to 95 times as large as radial width of the inner peripheral convex portion.

3. A solenoid comprising:
a coil wound into an annular shape and configured to generate magnetic force by being energized;
a mover comprising a magnetic element provided to be movable in a winding axis direction of the coil; and
a stator arranged to face the mover,
the stator in which an outer peripheral convex portion, an inner peripheral convex portion, and a middle convex portion located between the outer peripheral convex portion and the inner peripheral convex portion are formed,
the mover and the stator being so configured that, when no current is being applied, axial distance between the outer peripheral convex portion of the stator and an outer peripheral portion of the mover which is radially closest to the outer peripheral convex portion is smaller than axial distance between the inner peripheral convex portion of the stator and an inner peripheral portion of the mover which is radially closest to the inner peripheral convex portion.

4. The solenoid according to claim 3,
wherein a protruding end of the middle convex portion of the stator includes a flat surface.

5. The solenoid according to claim 4,
wherein the mover is provided with a middle concave portion corresponding to the middle convex portion of the stator, and
wherein the solenoid includes a flat surface between the outer peripheral portion of the mover and an outer diameter side of the middle concave portion and/or between the inner peripheral portion of the mover and an inner diameter side of the middle concave portion.

6. The solenoid according to claim 3,
wherein the mover is provided with a middle concave portion corresponding to the middle convex portion of the stator, and
wherein the solenoid includes a flat surface between the outer peripheral portion of the mover and an outer diameter side of the middle concave portion and/or between the inner peripheral portion of the mover and an inner diameter side of the middle concave portion.

7. The solenoid according to claim 6,
wherein a bottom portion of the middle concave portion of the mover includes a flat surface.

8. A solenoid comprising:
a coil wound into an annular shape and configured to generate magnetic force by being energized;
a mover comprising a magnetic element provided to be movable in a winding axis direction of the coil; and
a stator arranged to face the mover, the stator in which an outer peripheral convex portion, an inner peripheral convex portion, and a concave indent portion located between the outer peripheral convex portion and the inner peripheral convex portion, the concave indent portion to which an opposed surface of the mover is substantially parallel are formed;

the solenoid being so configured that a peak of attractive force with respect to approach distance between the outer peripheral convex portion and the mover differs from a peak of attractive force with respect to approach distance between the inner peripheral convex portion and the mover.

9. A solenoid comprising:

a coil wound into an annular shape and configured to generate magnetic force by being energized;

a mover comprising a magnetic element provided to be movable in a winding axis direction of the coil; and a stator arranged to face the mover, the stator in which an outer peripheral convex portion, an inner peripheral convex portion, and a concave indent portion located between the outer peripheral convex portion and the inner peripheral convex portion, the concave indent portion to which an opposed surface of the mover is substantially parallel are formed;

the mover and the stator being so configured that timing at which the outer peripheral convex portion of the stator and an outer peripheral portion of the mover face each other in a radial direction is shifted from timing at which the inner peripheral convex portion of the stator and an inner peripheral portion of the mover face each other in the radial direction.

10. A damping force adjustment mechanism comprising:

a coil wound into an annular shape and configured to generate magnetic force by being energized;

a mover comprising a magnetic element provided to be movable in a winding axis direction of the coil;

a stator arranged to face the mover; and a control valve controlled by motion of the mover, the stator in which an outer peripheral convex portion, an inner peripheral convex portion, and a concave indent portion located between the outer peripheral convex portion and the inner peripheral convex portion, the concave indent portion to which an opposed surface of the mover is substantially parallel are formed, the mover and the stator being so configured that, when no current is being applied, axial distance between the outer peripheral convex portion of the stator and an outer peripheral portion of the mover which is radially closest to the outer peripheral convex portion is smaller than axial distance between the inner peripheral convex portion of the stator and an inner peripheral portion of the mover which is radially closest to the inner peripheral convex portion.

11. A damping force adjustable shock absorber comprising:

a cylinder in which hydraulic fluid is sealingly contained;

a piston that is slidably provided inside the cylinder;

a piston rod that is coupled to the piston and extends outside the cylinder; and a damping force adjustment mechanism configured to generate damping force by controlling a hydraulic fluid flow generated by sliding motion of the piston in the cylinder, the damping force adjustment mechanism comprising:

a coil wound into an annular shape and configured to generate magnetic force by being energized;

a mover comprising a magnetic element provided to be movable in a winding axis direction of the coil;

a stator arranged to face the mover; and a control valve controlled by motion of the mover, the stator in which an outer peripheral convex portion, an inner peripheral convex portion, and a concave indent portion located between the outer peripheral convex portion and the inner peripheral convex portion, the concave indent portion to which an opposed surface of the mover is substantially parallel are formed, the mover and the stator being so configured that, when no current is being applied, axial distance between the outer peripheral convex portion of the stator and an outer peripheral portion of the mover which is radially closest to the outer peripheral convex portion is smaller than axial distance between the inner peripheral convex portion of the stator and an inner peripheral portion of the mover which is radially closest to the inner peripheral convex portion.

* * * * *